(12) United States Patent
Vargas et al.

(10) Patent No.: US 9,934,486 B2
(45) Date of Patent: *Apr. 3, 2018

(54) DYNAMIC SCAN CONTEXT DETERMINATION FOR ASSET RECONCILIATION BACKGROUND

(71) Applicant: HAND HELD PRODUCTS, INC., Fort Mill, SC (US)

(72) Inventors: Joseph Vargas, Sante Fe, NM (US); Tom Plocher, Hugo, MN (US); Ynjiun Paul Wang, Cupertino, CA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,804

(22) Filed: Apr. 28, 2016

(65) Prior Publication Data
US 2016/0239797 A1 Aug. 18, 2016

Related U.S. Application Data

(63) Continuation of application No. 13/461,211, filed on May 1, 2012, now Pat. No. 9,342,810.

(51) Int. Cl.
H04Q 5/22 (2006.01)
G06Q 10/08 (2012.01)
(Continued)

(52) U.S. Cl.
CPC ......... *G06Q 10/087* (2013.01); *G06K 19/072* (2013.01); *G06K 19/0723* (2013.01);
(Continued)

(58) Field of Classification Search
None
See application file for complete search history.

(56) References Cited

U.S. PATENT DOCUMENTS 7,298,264 B1 11/2007 Kuzma et al.
7,518,511 B1 4/2009 Janja et al.
(Continued)

FOREIGN PATENT DOCUMENTS

EP 2 101 291 A1 9/2009
WO 01/044082 A2 6/2001

OTHER PUBLICATIONS

Nov. 27, 2013 Search Report issued in European Patent Application No. 13163013.9.
(Continued)

*Primary Examiner* — Firmin Backer
*Assistant Examiner* — Adnan Aziz
(74) *Attorney, Agent, or Firm* — Oliff PLC; R. Brian Drozd

(57) ABSTRACT

Asset reconciliation is facilitated by dynamically determining and applying a scan context to asset-describing tag data. Tag data representative of assets are received from RFID tags. A working scan context defining a scope of coverage of assets to be included in an asset reconciliation is dynamically determined based on the received tag data. Additional tag data representative of additional assets are received, and the dynamically determined working scan context is applied to the additional tag data to automatically identifying which assets of the additional assets are to be included in the asset reconciliation. Assets included in the scope of coverage of the working scan context are included in the asset reconciliation, and assets not included in the scope of coverage of the working scan context are not included in the asset reconciliation.

20 Claims, 9 Drawing Sheets

(51) Int. Cl.
*G06K 19/07* (2006.01)
*G06Q 20/20* (2012.01)
*B62B 3/14* (2006.01)
*H04B 5/00* (2006.01)

(52) U.S. Cl.
CPC ........ *G06Q 10/0833* (2013.01); *B62B 3/1424* (2013.01); *G06K 19/0727* (2013.01); *G06Q 10/08* (2013.01); *G06Q 20/203* (2013.01); *H04B 5/0062* (2013.01); *H04B 5/0068* (2013.01)

(56) References Cited

U.S. PATENT DOCUMENTS

| | | | |
|---|---|---|---|
| 7,679,522 B2 | 3/2010 | Carpenter | |
| 8,452,860 B2* | 5/2013 | Agarwal | G06K 7/0008 709/223 |
| 8,456,306 B2 | 6/2013 | Lin et al. | |
| 8,854,190 B2 | 10/2014 | Bodapati et al. | |
| 8,860,557 B2* | 10/2014 | Wilkinson | G06K 7/10009 340/10.42 |
| 8,994,508 B2* | 3/2015 | Dacus | G06K 7/0008 235/375 |
| 2002/0008140 A1* | 1/2002 | Reynolds | G06K 7/0008 235/385 |
| 2003/0227392 A1 | 12/2003 | Ebert et al. | |
| 2005/0149414 A1 | 7/2005 | Schrodt et al. | |
| 2006/0022814 A1* | 2/2006 | Nogami | G06K 7/10079 340/505 |
| 2006/0077036 A1* | 4/2006 | Roemerman | G06Q 10/08 340/5.61 |
| 2006/0103534 A1* | 5/2006 | Arms | E01F 13/12 340/572.1 |
| 2006/0232410 A1 | 10/2006 | Swan | |
| 2007/0035396 A1 | 2/2007 | Chand et al. | |
| 2007/0159305 A1* | 7/2007 | Cesar | G05B 19/0421 340/10.32 |
| 2008/0001748 A1 | 1/2008 | Childress et al. | |
| 2008/0018431 A1* | 1/2008 | Turner | G06K 7/0008 340/10.2 |
| 2008/0100439 A1 | 5/2008 | Rinkes | |
| 2008/0100445 A1 | 5/2008 | Horwitz et al. | |
| 2009/0006309 A1* | 1/2009 | Hunt | G06Q 30/02 |
| 2009/0160622 A1 | 6/2009 | Bauchot et al. | |
| 2009/0192872 A1 | 7/2009 | Moritz et al. | |
| 2009/0210320 A1 | 8/2009 | Adelman et al. | |
| 2009/0231135 A1 | 9/2009 | Chaves et al. | |
| 2010/0065636 A1 | 3/2010 | Byun et al. | |
| 2011/0050396 A1 | 3/2011 | Chaves | |
| 2011/0188752 A1 | 8/2011 | Wang | |
| 2012/0013440 A1 | 1/2012 | von Bose et al. | |
| 2012/0075076 A1 | 3/2012 | Wang | |
| 2012/0161967 A1 | 6/2012 | Stern | |
| 2012/0161968 A1 | 6/2012 | Bodapati et al. | |
| 2012/0166241 A1* | 6/2012 | Livingston | G06Q 30/00 705/7.12 |
| 2012/0235817 A1 | 9/2012 | Forster | |
| 2013/0187765 A1* | 7/2013 | Smith | G06K 7/10009 340/10.51 |
| 2013/0278393 A1* | 10/2013 | Zumsteg | G06K 7/10079 340/10.6 |

OTHER PUBLICATIONS

Mar. 8, 2017 Office Action issued in European Patent Application No. 13 163 13.9.
Yan-Mei et al; "Application of RFID and Data Mining in the Timber Management System;" Control, Automation and Systems Engineering (CASE), 2011 International Conference on, IEEE; Jul. 30, 2011; XP032046600; pp. 1-4.
Bai et al; "Efficiently Filtering RFID Data Streams;" CleanDB Workshop; Seoul, Koreak 2006; 6 pp.

* cited by examiner

US 9,934,486 B2

DYNAMIC SCAN CONTEXT DETERMINATION FOR ASSET RECONCILIATION BACKGROUND

CROSS-REFERENCE TO RELATED APPLICATIONS

This is a Continuation of application Ser. No. 13/461,211 filed May 1, 2012. The disclosure of the prior application is hereby incorporated by reference herein in its entirety.

BACKGROUND

Radio-frequency identification (RFID) is a data collection technology that uses radio-sensitive tags for storing data. Typically, the data indicates properties of an asset or assets to which the RFID tag corresponds. For instance, an article of clothing may have attached thereto an RFID tag uniquely identifying the article, including properties (model, color, size, etc.) thereof. RFID tags, which are also commonly referred to as transponders, typically comprise two parts. The first part is an integrated circuit for storing and processing data, modulating and demodulating radio-frequency (RF) signals, and performing other specialized functions. The second part of the RFID tag is an antenna that provides the means for the integrated circuit to transmit its stored data to an RFID reading device (also referred to herein as an interrogator). An RFID reading device can be incorporated into a larger mobile unit referred to herein as an RFID reader, scanner, or portable data terminal.

Radio-frequency identification readers have the ability to receive and decode tags from many different orientations and distances. This is one of the great advantages of RFID technology over, for instance, barcode-reading and other technology that requires line-of-sight. However, with the convenience afforded by RFID reading comes the disadvantage of tag pollution when RFID tags are read in a highly populated (by RFID tags) space. RFID readers generally do not discriminate between the tag data received from RFID tags. Tag pollution refers to tendency for RFID readers to receive (and possibly decode) tag data from RFID tags which are extraneous—that is, outside of the scope of what is desired to be scanned and observed. Furthermore, radio-frequency reflection, in which signals tend to reflect off of metallic materials, such as inventory fixtures, equipment, and even other RFID tags, can also be problematic. It is in some cases impractical and/or virtually impossible to scan only a particular area, region, or subset of tags (from e.g. clothes stacked on a rack), or even to know precisely from which direction the reader is attempting to read, making asset tracking, such as for inventory and other purposes, difficult.

Current systems in place can take advantage of simple programming logic to help mitigate this issue, in which the reader is preprogrammed, such as with predetermined list(s) of expected serial numbers or electronic product codes associated with RFID tags. The predetermined lists are created by an inventory tracking/management system and are based on knowledge the system possesses as to which inventory exists. Current RFID technology in the retail space is thereby reduced to no more that a 'verification counting system', in which only received tags on the predetermined list are 'counted' and compared to an expected count in an inventory database.

BRIEF SUMMARY

The shortcomings of the prior art are overcome and additional advantages are provided through the provision of a method for facilitating radio frequency identification-based asset reconciliation. The method includes, for instance, receiving tag data from a plurality of radio frequency identification tags carrying the tag data, the tag data representative of a plurality of assets, dynamically determining, based on the tag data of the plurality of radio frequency identification tags, a working scan context, the working scan context defining a scope of coverage of assets to be included in an asset reconciliation, subsequent to the dynamically determining, receiving additional tag data from one or more additional radio frequency identification tags carrying the additional tag data, the additional tag data representative of one or more additional assets, and applying the dynamically determined working scan context to the additional tag data from the one or more additional radio frequency identification tags, the applying automatically identifying which assets of the one or more additional assets are to be included in the asset reconciliation, wherein responsive to the tag data of a radio frequency identification tag of the one or more additional radio frequency identification tags being representative of an asset within the scope of coverage defined by the working scan context, the asset is included in the asset reconciliation.

Additionally, a system is provided for facilitating radio frequency identification-based asset reconciliation. The system includes a memory and a processor, in communication with the memory. The system is configured to perform a method including, for instance, receiving tag data from a plurality of radio frequency identification tags carrying the tag data, the tag data representative of a plurality of assets, dynamically determining, based on the tag data of the plurality of radio frequency identification tags, a working scan context, the working scan context defining a scope of coverage of assets to be included in an asset reconciliation, subsequent to the dynamically determining, receiving additional tag data from one or more additional radio frequency identification tags carrying the additional tag data, the additional tag data representative of one or more additional assets, and applying the dynamically determined working scan context to the additional tag data from the one or more additional radio frequency identification tags, the applying automatically identifying which assets of the one or more additional assets are to be included in the asset reconciliation, wherein responsive to the tag data of a radio frequency identification tag of the one or more additional radio frequency identification tags being representative of an asset within the scope of coverage defined by the working scan context, the asset is included in the asset reconciliation.

Further, a computer program product is provided for facilitating radio frequency identification-based asset reconciliation. The computer program product includes a non-transitory storage medium readable by a processor and storing executable instructions for execution by the processor to facilitate performing, for instance, receiving tag data from a plurality of radio frequency identification tags carrying the tag data, the tag data representative of a plurality of assets, dynamically determining, based on the tag data of the plurality of radio frequency identification tags, a working scan context, the working scan context defining a scope of coverage of assets to be included in an asset reconciliation, subsequent to the dynamically determining, receiving additional tag data from one or more additional radio frequency identification tags carrying the additional tag data, the additional tag data representative of one or more additional assets, applying the dynamically determined working scan context to the additional tag data from the one or more additional radio frequency identification tags, the applying automatically identifying which assets of the one or more additional assets are to be included in the asset reconciliation, wherein responsive to the tag data of a radio frequency identification tag of the one or more additional radio frequency identification tags being representative of an asset within the scope of coverage defined by the working scan context, the asset is included in the asset reconciliation.

Yet further, a method for facilitating radio frequency identification-based asset reconciliation is provided, the method including, for instance, receiving a predefined asset reconciliation list including a list of assets to be included in the asset reconciliation, determining a working scan context based on the list of assets of the predefined asset reconciliation list, the working scan context defining a scope of coverage of assets to be included in the asset reconciliation, subsequent to the determining, receiving tag data from one or more radio frequency identification tags carrying the tag data, the tag data representative of one or more assets, and applying the determined working scan context to the tag data from the one or more radio frequency identification tags, the applying automatically identifying which assets of the one or more assets are to be included in the asset reconciliation, wherein responsive to the tag data of a radio frequency identification tag of the one or more radio frequency identification tags being representative of an asset within the scope of coverage defined by the working scan context, the asset is included in the asset reconciliation.

In addition, a method for facilitating radio frequency identification-based asset reconciliation is provided, the method including, for instance, receiving a predefined asset reconciliation list including a list of assets to be included in the asset reconciliation, determining a first scan context, based on the list of assets of the predefined asset reconciliation list, the first scan context defining a first scope of coverage of assets to be included in the asset reconciliation, receiving tag data from a plurality of radio frequency identification tags carrying the tag data, the tag data representative of a plurality of assets, determining based on the tag data of the plurality of radio frequency identification tags, a second scan context, the second scan context defining a second scope of coverage of assets to be included in the asset reconciliation, selecting one of the first scan context or the second scan context as a working scan context for applying to the received tag data from the plurality of radio frequency identification tags to automatically identify which assets of the plurality of assets are to be included in the asset reconciliation, and maintaining the other scan context of the first scan context or the second scan context as a candidate scan context for dynamically switching the working scan context, responsive to satisfying a condition for switching the working scan context, based on tag data received from further radio frequency identification tags.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In contrast to a line-of-sight based identifier, such as a bar code, an RFID tag need not be in the line-of-sight of an RFID reading device for reading. In one example, the radio transceiver of the RFID reading device generates a weak radio signal and an antenna of the RFID reading device transmits the radio signal. The radio signal may have a range from a few feet to a few yards. If an RFID tag receiving the radio signal is "passive," the radio signal "wakes up" or activates the RFID tag, and the RFID tag responds by transmitting the data stored in its integrated circuit via radio signal to the RFID reading device. If the RFID tag is "active," the RFID reading device's radio signal need not "awaken" the RFID tag. An active RFID tag has a power source such as a battery that is used to boost its effective operating range. An active RFID tag will simply send its stored data by radio signal to the RFID reading device in response to receiving a radio signal from the RFID reading device.

The communications between an RFID tag and an RFID reading device take place over a radio-based air interface. One such air interface is the Class 1 Generation 2 UHF Air Interface protocol (commonly referred to as the "Gen 2" standard), which is a standard administered by EPCglobal Inc. Gen 2 defines, among other things, requirements for the format of the data, such as an Electronic Product Code (EPC), stored in the integrated circuit of an RFID tag. According to Gen 2, an EPC must comprise at least ninety-six bits and can include a unique serial number of a particular product to which a Gen 2 RFID tag is attached.

Figure 1:
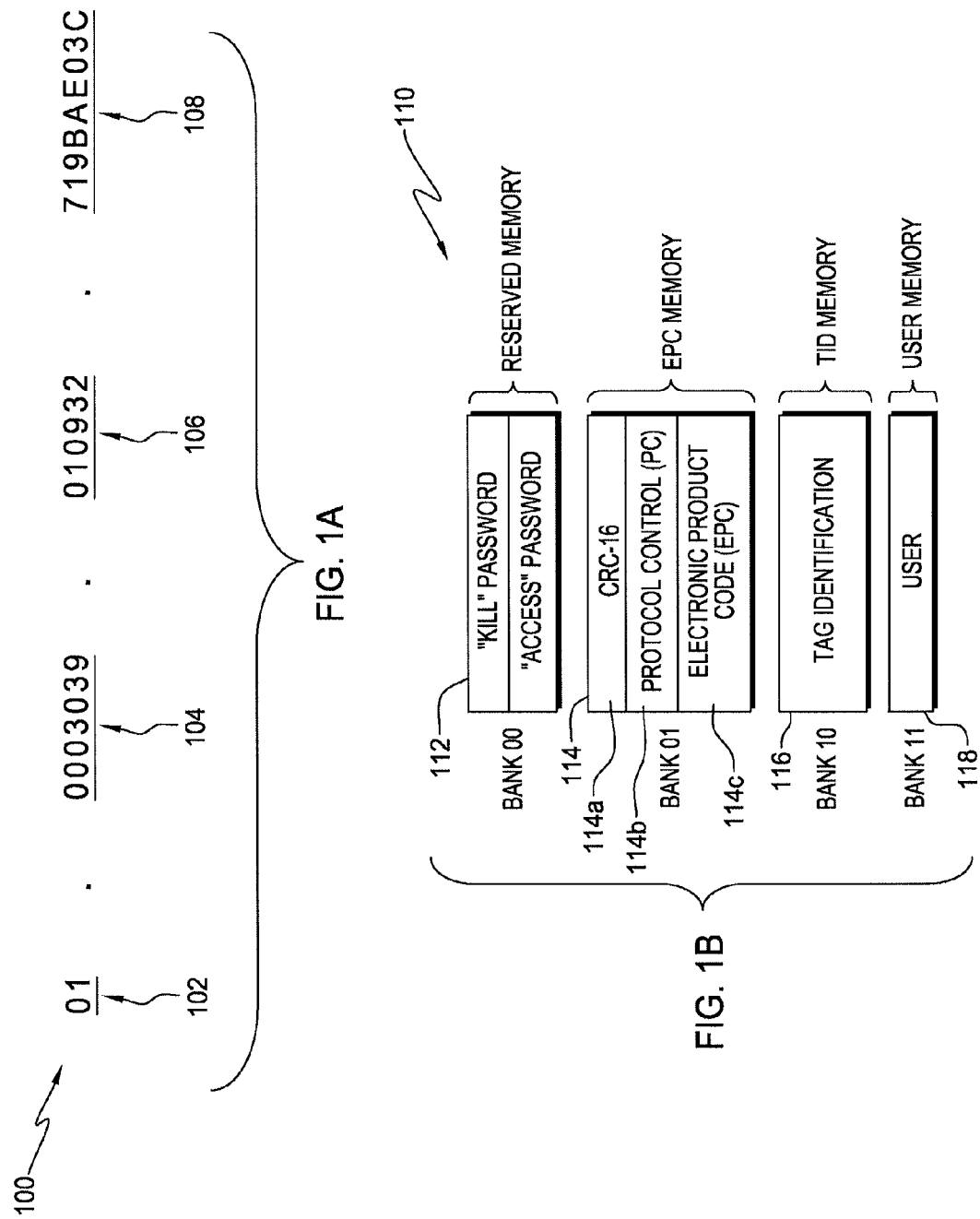
FIG. 1A depicts an exemplary Electronic Product Code carried in tag data of a radio frequency identification tag.
FIG. 1B depicts one example of a radiofrequency identification tag format.

FIG. 1A depicts an exemplary Electronic Product Code carried in tag data of a radio frequency identification tag. An exemplary EPC 100 comprises header 102, manager number 104, object class 106, and serial number 108. In this particular example, header 102 is eight bits in size, manager number 104 is twenty-eight bits in size, object class 106 is twenty-four bits in size, and serial number 108 is thirty-six bits in size. While EPC 100 is ninety-six bits in size, other EPCs can have different sizes that can be defined by EPCglobal Inc., e.g., sixty-four bits.

Each two digit sequence in EPC 100 is a hexadecimal number representing eight bits (one byte) of EPC 100. Header 102 defines the length, type, structure version, and generation of EPC 100 (e.g., Gen 2 in this example). Manager number 104 is the entity responsible for maintaining object class 106 and serial number 108, e.g., a manufacturer, such as a company that manufactures an asset being represented by the object class and serial number. Object class 106 identifies an asset, such as a product or other physical object. Object class 106 can be, e.g., a stock keeping unit (SKU) or consumer unit and can identify/indicate asset properties or product type, such as characteristics and traits about the asset represented by the object class and serial number. Serial number 108 identifies a unique serial number for the asset within object class 106. Thus, while object class 106 can categorically identify the asset as being, e.g. jeans, the color, size, and fit thereof, serial number 108 can uniquely identify a particular pair of jeans identified by object class 106. Thus, in contrast to, for instance, a Universal Product Code (UPC) in a bar code which identifies a type and brand of an item, an EPC records a version, manufacturer, product type and unique serial number unique for that item.

An EPC can encode an identifier using various coding schemes, one of which is based on the Global Trade Item Number (GTIN) format. In generating an EPC for a product, Universal Product Code and European Article Number (EAN-13) identifiers for the product can be mapped into a GTIN. A GTIN is typically a 14-digit identifier formed by adding leading zero(s) to the UPC or EAN-13 identifier of the product to produce a full 14 digit GTIN. The GTIN, therefore, encodes the UPC or EAN-13 for the product, and consequently the manufacturer and product type, in, for instance, the manager number and object class of the EPC. To attach a GTIN to a unique product of the class indicated in the GTIN, a Serialized Global Trade Item Number (SGTIN) can be constructed by combining the GTIN with the unique serial number for the product. The EPC, such as EPC 100, can be constructed as the SGTIN and embedded in an RFID tag attached to the product, as is recognized by those having ordinary skill in the art.

RFID tags can carry data using various formats. FIG. 1B depicts one example of a radiofrequency identification tag format, and more specifically, the "Gen. 2" format noted above. In the Gen. 2 format 110, as is appreciated by those having ordinary skill in the art, tag memory includes four memory banks Reserved memory 112 (Bank 00) contains kill and access passwords, applicable if passwords are implemented on the tag. EPC memory (Bank 01) includes a stored CRC-16 114 a, Protocol Control word 114 b, and an EPC 114 c, such as is described above. TID memory 116 (Bank 10) stores a tag ID or serial number to uniquely identify the RFID tag. User memory 118 (Bank 11) is a user-specific data storage that is optionally utilized.

Whether scanning items on a shelf, fixture (such as a clothing rack), in a box, etc., the issues of tag pollution and reflection are apparent with current RFID technology. There exists no consistent and reliable way to introduce into an inventory system assets associated with new RFID tags (i.e. items that are not expected by the system), or to scan only a particular set of tags when other tags are in the vicinity (e.g. limiting scan scope to a singular rack of clothes to get inventory count on that particular rack). This reduces the efficiency and limits the potential of RFID technology.

According to aspects of the present invention, tag data of scanned RFID tags can be mined in order to produce context for (and therefore limit) a particular scan and, for instance, intelligently sort assets that are to be included or excluded from an asset reconciliation. An asset reconciliation refers to the correlation of scanned items, i.e. actual inventory, with, e.g. the representation of that inventory in a backend database. The tag data, such as EPC information, can be used to automatically make connections between received tag data from RFID tags, and, in turn, dynamically develop a working scan context that defines the scope of coverage of assets in which a user is interested, for instance to perform an asset reconciliation.

Figure 2:
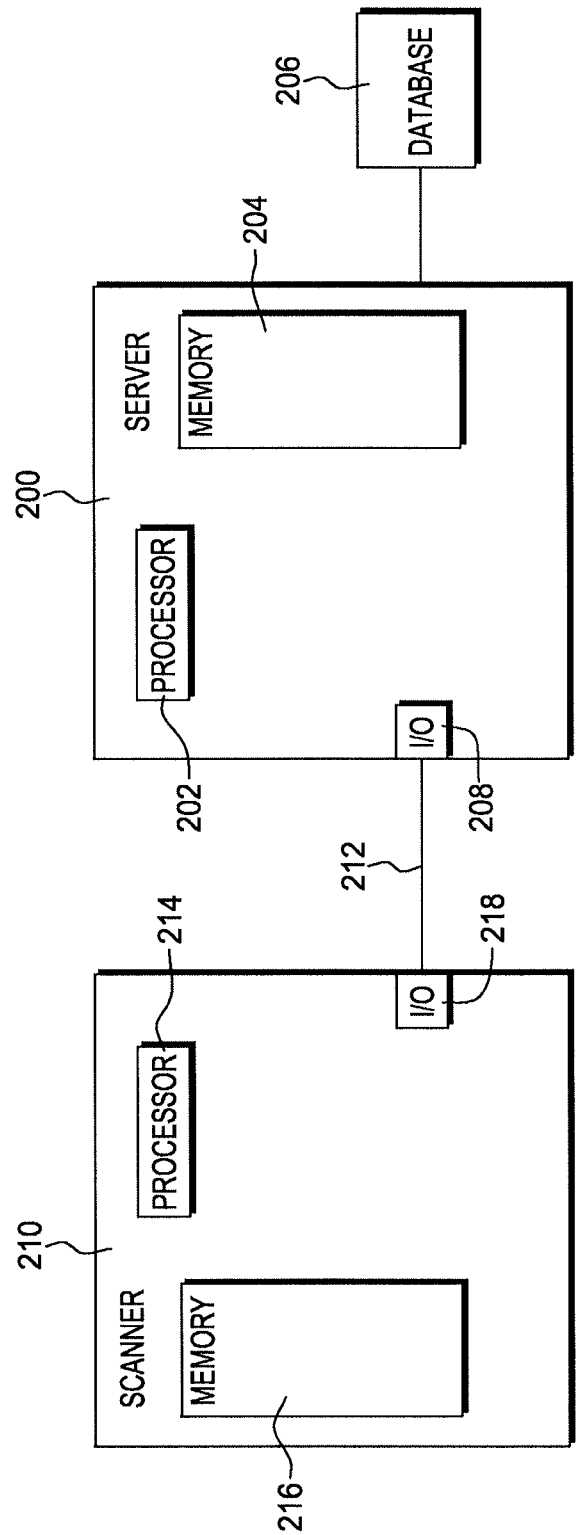
FIG. 2 depicts one example of an environment to incorporate and use one or more aspects of the present invention.

FIG. 2 depicts one example of an environment to incorporate and use one or more aspects of the present invention. In FIG. 2, a data processing system 200 includes one or more processor(s) 202 in communication with a memory 204 via one or more communications links (i.e. busses; not pictured). Memory 204 includes, as examples, a hard disk, random access memory (RAM), read-only memory (ROM), erasable programmable read-only memory (EPROM or Flash memory), portable compact disc read-only memory (CD-ROM), optical storage, magnetic storage device, or any suitable combination of the foregoing. Processor(s) 202 obtain from memory 204 one or more instructions of program code for execution by processor(s) 202. Processor(s) 202 execute an operating system and one or more program(s) embodied in program code stored in memory 204. In addition, data processing system 200 is in communication with a database 206, which itself comprises memory, such as one or more hard disks, for storing data, such as inventory data.

Additionally, data processing system 200 includes one or more input/output (I/O) component(s) 208 for facilitating data input/output to and from data processing system 200. More specifically, I/O component(s) 208 comprises at least one communications interface for communicating data between data processing system 200 and a scanner 210 to which data processing system 200 is coupled via a communications link 212. In one example, the communications interface includes a wireless and/or wired network adapter for communication of data between data processing system 200 and scanner 210 across one or more networks (indicated as communication link 212 in FIG. 2).

Scanner 210 similarly includes at least one processor 214, memory 216, and I/O component(s) 218, in which processor(s) 214 obtain from memory 216 one or more instructions for execution by the processor(s) 214 to perform functions. One such function includes RFID scanning, in which an RFID module included in I/O component(s) 218 receives tag data from RFID tags. The tag data can be stored (e.g. in memory 216), processed (e.g. by processor(s) 214), and/or transmitted, for instance across communications link 212 to data processing system 200 for processing (e.g. by processor(s) 202) and/or storage (e.g. in database 206).

In one particular example, scanner 210 is a mobile/portable data terminal that receives tag data from RFID-tagged assets and operates in a server/client relationship with server 200, in which server 200 is an inventory management system having database 206 of asset inventory. Scanner 210 can scan RFID tags and, in response, receive tag data therefrom. In one embodiment, scanner 210 comprises a "thick client" of server 200, in which case the tag data is accumulated and stored in scanner 210, and later batch uploaded or synced to server 200 at, for instance, the end of scanning session. In the retail context, an example of such scanning session is when a sales associate scans a collection of assets on the retail floor and afterwards batch-uploads the tag data to a backend server.

In another embodiment, scanner 210 comprises a "thin client" of server 200, in which case the tag data is provided substantially in real-time as it is received by scanner 210 to server 200 for processing. In this example, scanner 210 and server 200 are in active communication across communications link 212 (such as one or more wired or wireless network links), and scanner 210 does little or no processing/storage of the received tag data.

It should be understood that while FIG. 2 depicts one example of a data processing system 200, those having ordinary skill in the art will recognize that modifications can be made thereto without departing from the principles of the invention disclosed herein. For instance, while data processing system 200 is depicted as acting as a single data processing system receiving/processing tag data from scanner 210, multiple data processing systems may instead be provided for facilitating aspects of the present invention. For instance, functions of data processing system 200, such as those described in connection with FIGS. 4-6 and elsewhere herein, can be implemented in a computing environment that comprises multiple data processing systems, for instance each specializing in an assigned function or functions, as will be appreciated by those having ordinary skill in the art.

In operation, scanner 210 acquires tag data from RFID tags and can store, process, and/or transmit the tag data (or portions thereof) to server 200 for further processing. In accordance with one or more aspects of the present invention, tag data processing described in connection with FIGS. 4-6 and elsewhere herein is performed by, e.g. the scanner or the server, to cluster tag data in order to determine proper working scan context(s). Clustering of tag data is described in further detail below with reference to FIG. 3.

Figure 3:
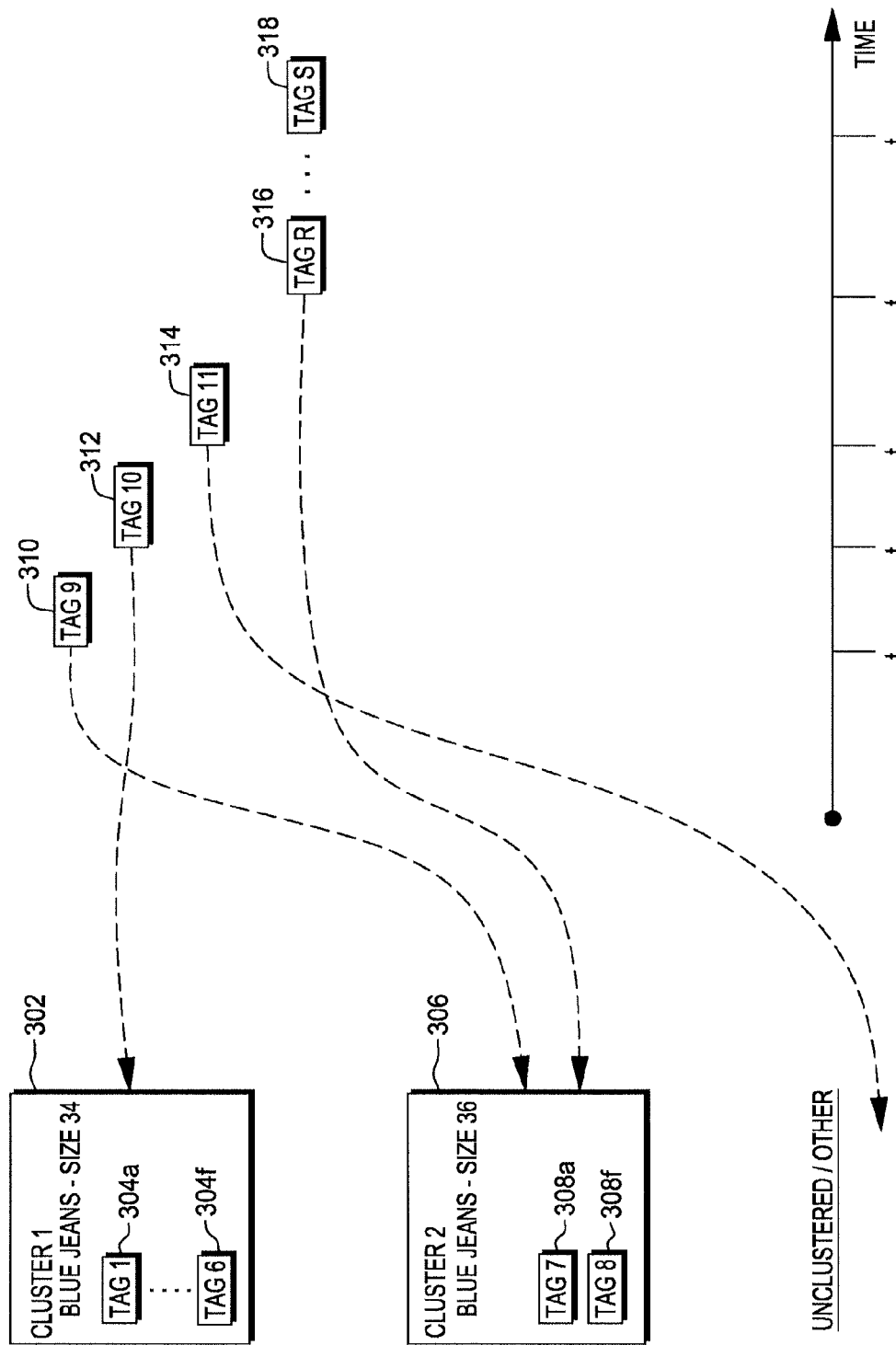
FIG. 3 depicts an example of radio-frequency identification tag data clustering to facilitate determining a working scan context, in accordance with one or more aspects of the present invention.

FIG. 3 depicts an example of radio-frequency identification tag data clustering to facilitate determining a working scan context, in accordance with one or more aspects of the present invention. A working scan context defines a scope of coverage of assets that a particular scan is interested in for, as an example, performing an asset reconciliation. When a working scan context is selected and applied to tag data, it has the effect of including and excluding assets (represented by that tag data) from an asset reconciliation. For example, a working scan context may define a scope of coverage as 'blue jeans', in which case, red colored jeans would not be within the scope of coverage of the scan context, and therefore tag data received for a pair of red jeans would be ignored or otherwise excluded from inclusion in the asset reconciliation for 'blue jeans'.

A challenge arises in defining the working scan context when a database is unaware of products that exist but which, ultimately, are to be included within an asset reconciliation. Suppose a user wishes to perform asset reconciliation for blue jeans that are currently in stock. The asset (inventory) database is aware of 'straight-fit' style blue jeans but no other model of blue jeans (such as relaxed-fit). A scan and reconciliation of the straight-fit style blue jeans would overlook 'relaxed-fit' style blue jeans, which clearly fit within the scope of the desired asset reconciliation but which, because the database is unaware of the relaxed-fit blue jeans product, will not be otherwise included in the asset reconciliation if the working scan context is set for the products of which the database is aware (straight-fit blue jeans). Aspects of the present invention therefore advantageously provide for dynamic determination of a proper working scan context, and in this example, could redefined the scope of the context on-the-fly to include the relaxed-fit blue jeans, even though the database in unaware of, and not expecting reconciliation for, relaxed-fit blue jeans.

Referring to FIG. 3, a clustering approach is provided in which clusters are dynamically created and maintained based on incoming tag data. Each cluster defines a scope or coverage for categorizing the tag data according to the assets being represented thereby. Incoming tag data becomes associated with an appropriate cluster if the tag data falls within the scope of coverage of that cluster. In FIG. 3, cluster 1 (302) encompasses blue jeans of size 34. Since tag data 304 a through 304 f of tags 1 through 6 represent blue jeans of size 34, tag data 304 a-f from tags 1-6 is thus assigned to cluster 1 (302). More specifically, to perform the clustering, in one example, an Electronic Product Code (EPC) being carried by the tag data from an RFID tag indicates that the asset to which the RFID tag is attached comprises a pair of size 34 blue jeans. Processing data mines this information from the tag data and associates the tag data from the RFID tag with an appropriate cluster.

Similarly, cluster 2 (306) encompasses blue jeans of size 36, and the tag data 308 a, 308 b from RFID tags 7 and 8 represent blue jeans of size 36.

FIG. 3 additionally depicts the receipt and clustering (as indicated by the dashed arrows) of additional RFID tags as time goes by. At time t0, tag data 310 from tag 9 is received. Tag data 310 is examined and it is determined that the EPC identifies another pair of size 36 blue jeans. Therefore, tag data 310 becomes associated with cluster 2 (306). At time t1, tag data 312 from tag 10 is received and it is determined to that the EPC identifies a pair of size 34 blue jeans. Tag data 312 therefore becomes associated with cluster 302.

Additionally, tag data 314 from tag 11 is received at time t2. It is determined that the asset represented in tag data 314, a red shirt, is neither size 34 blue jeans nor size 36 blue jeans. Tag data 314 is therefore not encompassed by either of cluster 1 (302) or cluster 2 (306). In one example, tag data 314 is added to a miscellaneous 'Other' cluster, or alternatively is left unclustered. In some cases, tag data in the 'other' cluster or that is left unclustered may later be added to a newly created or modified cluster having a scope that encompasses the tag data. Additionally, if there is significant similarity among the tag data in the 'other' cluster, then the other cluster may itself be converted into a cluster having a defined scope of asset coverage that is consistent with the tag data in the other cluster.

Finally, tag data 316 through 318 from tags R through S, received at times $t_R$ through $t_S$, and are determined to be representative of blue jeans of size 36 and are associated as they are received with cluster 2 (306).

In this manner, tag data is clustered using, for instance, algorithms to logically link together assets based on criteria, such as type (e.g., shirts, pants, electronics, etc.), style, color, gender, vendor, etc, or any other asset property. Since this information is stored within each EPC, the data is readily and easily attainable. In some examples, clustering is based on matching GTINs (encoded in the EPC). In other examples, clustering is based on matching UPCs or EAN-13s, matching manufacturer, or matching product type, which can all be derived from the GTIN encoded in the EPC.

The clustering of the tag data can be used to determine a working scan context defining a scope of coverage of assets to be included for the asset reconciliation. In one example, one or more clusters can be selected to define the proper working scan context.

A working scan context can be dynamically determined, in one example absent a priori knowledge of the scanner or database about the types of products that are to be included in the asset reconciliation. For instance, suppose that asset reconciliation is to be performed on size 34 blue jeans and that a user approaches a clothing fixture having the size 34 blue jeans (which also happens to have other products, such as size 36 blue jeans, mixed into it). The user begins scanning the fixture and receives tag data (304 *a-f*, 308 *a-b*) from tags 1-8. According to aspects of the invention, processing, performed for instance by the scanner or a server, can data mine the received tag data to perform clustering thereof. The processing can further identify that cluster 1 (302) contains tag data from six assets, while cluster 2 (306) contains tag data from only two assets. It can be determined, based on this, that the proper working scan context to be applied is for size 34 blue jeans, and that size 36 blues jeans are not to be included in the asset reconciliation. The working scan context can be dynamically determined to be cluster 1 (302)—'blue jeans of size 34'—in which blue jeans of size 34 are to be included in the asset reconciliation when the user has finished performing the scan. Assets categorized in cluster 2 (306) or left uncategorized can be excluded from the asset reconciliation.

The cluster definitions, and consequently the dynamically determined working scan context, can change dynamically as new tag data is received. For instance, suppose that the assets represented in tag data 304 *a*, 304 *b*, 304 *c* from tags 1-3 in FIG. 3 are straight-fit size 34 blue jeans, while the assets represented in tag data 304 *d*, 304 *e*, 304 *f* from tags 4-6 are relaxed-fit size 34 blue jeans. In this case after receiving the tag data from tags 1-6 the processing may have established two different clusters—one for 'straight-fit size 34 blue jeans' and one for 'relaxed-fit size 34 blue jeans'. At that point, since each cluster has only three assets, and since the two clusters each contain the same number of assets, it is difficult to identify a proper working scan context as between the two clusters. However, with the receipt of tag data from tags 7 and 8, and therefore the addition of size 36 blue jeans, say one straight-fit (tag 7) and one relaxed-fit (tag 8), the cluster definitions may be modified, such that the categorization no longer accounts for fit-type, but instead incorporates just color and size (this is the case depicted in FIG. 3). Consequently, the cluster definitions change to blue jeans of size 34 (cluster 1 (302)) and blue jeans of size 36 (cluster 2 (306)).

It should be noted that cluster scope need not be mutually exclusive. That is, many different clusters of varying breadth of scope (granularity) may be maintained, such that tag data from a single RFID tag could become associated with multiple clusters. Take, for instance, an example in which the scanner receives tag data from (i) 25 straight-fit blue jeans of size 34, (ii) 20 relaxed-fit blue jeans of size 34, (iii) 5 straight-fit blue jeans of size 36, and (iv) 2 medium sized red t-shirts. One set of clusters may include cluster A having scope of 'blue jeans' and encompassing the 50 blue jeans assets, and cluster B having scope 't-shirts' encompassing the 2 t-shirt assets. Another set of clusters may include cluster C having scope 'size 34 blue jeans' (45 assets), cluster D having scope 'size 36 blue jeans' (5 assets) and leaving the two t-shirts unclustered. A further set of clusters may include cluster E having scope 'size 34 straight-fit blue jeans' (25 assets), cluster F having scope 'size 34 relaxed fit blue jeans' (20 assets), cluster G having scope 'size 36 straight fit blue jeans' (5 assets), and leaving the two t-shirts unclustered. Thus, tag data can be grouped according to any number of permutations of the asset properties embedded in the tag data thereof. The different clusters can be maintained and their size and growth rate tracked in order to determine proper working scan context.

The processing of the tag data can also incorporate a confidence measurement, indicating how confident the system is that a particular cluster defines the appropriate scope for the desired asset reconciliation. Confidence measurement can be obtained using known techniques, such as based on the number of tag data included in the clusters, and rates at which the tag data are added thereto. FIG. 3 encompasses only a very small number of RFID tags, and therefore the confidence that cluster 1 (302) defines the appropriate scope for the asset reconciliation may be relatively low. However, if additional tags were received and cluster 1 (302) included 100 tags, while cluster 2 (306) included only two tags, the confidence would be greatly increased that cluster 1 (302) properly defines the scope of assets to be included in the asset reconciliation.

Ultimately, one (or more) clusters will be dynamically determined, for instance based on a confidence measurement, to represent the proper working scan context, and will be selected as defining the proper scope of assets to be included in asset reconciliation. The dynamically determined working scan context can then be applied (either automatically or manually by the user) to the received (and to-be-received) tag data to include/exclude the assets associated therewith in the asset reconciliation. In FIG. 3, if cluster 1 (302) is determined to be the working scan context and applied to the received tag data, then assets represented in tag data of cluster 1 (302) (i.e. size 34 blue jeans) will be included in the asset reconciliation. Assets represented in tag data not included in cluster 1 (302), for instance size 36 blue jeans, will be excluded from the asset reconciliation.

Cluster definitions may, in some embodiments, be based, at least in part, on a priori knowledge of the tag data expected to be received. For instance, a predefined asset reconciliation list of assets to be included in the asset reconciliation can be received, and a predefined working scan context can be determined in order to pre-establish cluster(s) for use categorizing assets for the asset reconciliation. The predefined list can include a subset of particular assets that are known to the database. For instance, using the above example, the database has knowledge of straight-fit size 34 blue jeans and the database indicates (via a list) the presence of the six straight-fit size 34 blue jeans, and this list is used to predefine (prior to the receipt of the tag data) a working scan context.

In one example, the predefined list could simply be 'size 34 straight-fit blue jeans' as indicated in the predefined list. Additionally or alternatively, the predefined working scan context can be defined based on the predefined list but encompass a different set of assets than those on the predefined list, and/or include a subset of assets thereof, or a superset of assets thereof (i.e. include additional assets not included on the predefined list). For instance, in one example, a predefined list includes a list of assets (such as serial numbers thereof) and, according to aspects of the present invention, the system can determine that all of the assets have the same manufacturer (for instance Levi's®, as indicated by the manager number) and product (for instance, jeans as indicated by the object class) and thus form a working context to cluster tag data for assets of the manufacturer 'Levi's®' and object class 'jeans', to perform the reconciliation (Levi's is a registered trademark of Levi Strauss & Co., San Francisco, Calif., USA). In is seen that the predefined working scan context is, in this case, boarder than the assets indicated on the predefined asset reconciliation list.

Thus, the predefining of a scan context based on the predefined assets reconciliation list can capture assets to be reconciled that are not previously known to the database. For instance, it can capture, in the above example, all jeans manufactured by Levi's®, such as jeans of any color, size, and fit type, which do not yet reside in the inventory database but which nevertheless reside actual inventory. In addition, the predefined scan context can be further adjusted after tag data is received. It may be determined that the predefined scan context is to be broadened or narrowed dynamically, for instance, to redefine a proper working scan context so as to capture different assets for the asset reconciliation.

In this manner, aspects of the invention facilitate two-way asset reconciliation, rather than just one-way reconciliation in which inventory counts are simply verified against the count in a database with prior knowledge of the inventory. Two-way asset reconciliation enables reconciliation of assets that exist in inventory but are unknown to the database or are outside of the predefined asset reconciliation list.

In any case, the dynamically determined working scan context can carry little or no effect on the actual list of assets to be included in the reconciliation until a user (e.g. of the scanner) indicates that the working scan context is to be applied to the received tag data to commit the inclusion/exclusion of the proper assets from the assets to be included in the asset reconciliation. For instance, after receiving enough data to, with some meaningful level of confidence, identify the proper working scan context, the user can be alerted that a working scan context has been determined and can be prompted to apply the working scan context to the received (and to-be-received) tag data. In one example, the assets to be included in the asset reconciliation are determined once the working scan context is applied. In one example, a list of assets can be maintained and, as additional tag data are received after the working scan context is applied, the assets associated therewith can be included or excluded from the list of assets to be included in the reconciliation depending on which cluster the additional tag data becomes associated with.

Referring to FIG. 3, suppose, after receiving tag data from tags 1-6, that the working scan context is dynamically determined by the processor to be 'blue jeans of size 34' based on, for instance, the fact that the number of assets within cluster 1 (302) exceeds a threshold percentage (say 60%) of scanned assets. The user can be alerted of the determined working scan context and can select to apply that context as the working scan context, in which case assets represented by tag data (both already received and to-be-received) are included or excluded from the to-be-performed asset reconciliation, depending on whether the asset fits within the scope of the applied working scan context.

In another embodiment, the working scan context can be automatically applied without first notifying a user. For instance, application of the determined working scan context can be automatic upon reaching a threshold confidence level for application of the working scan context, which, in one embodiment, may be predefined by a user using the RFID reader. The confidence level may be based on a percentage of total tags being categorized in a particular cluster. For instance, a threshold of 80% could correspond to 80% or more tags being clustered in a particular cluster. The determination may be made after receiving a minimum number of tags (say 100). In this case, if 80% or more of the received tag data fall within a particular cluster, then the working scan context comprising that cluster is automatically applied, causing tags not within that cluster to be excluded from the asset reconciliation.

The user can be optionally notified via a display screen, for instance, of the automatically (or user-selected) working scan context at all times. Additionally, multiple clusters and/or multiple possible working scan contexts can be tracked simultaneously and displayed for the user to identify the categorization of tag data and the current working scan context, and to, if desired, manually select a working scan context.

Dynamic switching from an applied working scan context to another working scan context is also possible. Thus, in addition to adjusting a predefined working scan context, when appropriate, to include additional assets not originally included in the predefined working scan context, working scan context switching can occur, wherein the working scan context is dynamically switched from a prior working scan context to a next working scan context during a scan session. In the case of a working scan context switch, at least two different scenarios are possible. In the first scenario, the working scan context switch represents an end to the collection of assets for a first asset reconciliation and a beginning of collection of assets for a second reconciliation. In such a case, assets within the scope of the prior working scan context are recorded for a first asset reconciliation, and the switching of the working scan context essentially begins tag data collection to perform another asset reconciliation using the next working scan context.

In the second scenario, a single asset reconciliation is being performed and the switch from the prior working scan context to the next working scan context simply dynamically redefines the working scan context for the asset reconciliation. In this regard, the dynamically determined working scan context is flexible in that it can adjust as additional tag data is received.

To illustrate, and referring to FIG. 3, suppose, as before, that the working scan context is dynamically determined to be cluster 1 (302) 'blue jeans of size 34'. The user has indicated that this working scan context is to be applied to the received tag data, meaning that assets represented by tag data 304 a-f are to be included in the asset reconciliation, while assets represented by tag data 308 a-b (and represented by unclustered tag data) are not to be included in the asset reconciliation. That working scan context continues to apply to tag data 310, 311 and 312, in which tag data 312 is included in cluster 1 (302) (and therefore included in the asset reconciliation), but tag data 310 and 314 are not. Suppose that tag data 316 through 318 represent a large number of size 36 blue jeans. At some point between time tR and tS, a context switch may be affected, wherein responsive to data mining the additionally received tag data 316 through 318 it is determined that cluster 1 (302) is no longer to remain active as the working scan context and that, instead, the working scan context is to be switched to cluster 2 (306). For instance, if many tag data of tag data 316 through tag data 318 are being associated with cluster 2 (306) and very few or no additional tag data are being associated with cluster 1 (302), the processing observes that cluster 1 has stopped growing (or is growing at a very small rate), while cluster 2 is growing much faster. This corresponds to a situation where a user has approached a rack, fixture, etc. for size 36 blue jeans and begun scanning the items, but that the first several received were actually (misplaced) size 34 blues jeans. It takes the receipt of the additional tag data of several size 36 blue jeans for the system to recognize that size 36 blue jeans actually represent the assets intended to be reconciled.

The user can be notified that a context switch from size 34 blue jeans to size 36 blue jeans is to be made, and the user can indicate how to handle the switch. In this situation, where the context switch is to take place take without performing a separate asset reconciliation on the initially scanned extraneous size 34 blue jeans, the initial working scan context (cluster 1 (302) for size 34 blue jeans) is, on the bases of receiving a large number of tag data for size 36 blue jeans (tag data 316 through 318), switched to select cluster 2 (306) as the proper working scan context for the asset reconciliation.

Alternatively, if the user wishes that two asset reconciliations be performed, the user can indicate that the first asset reconciliation is to be performed using cluster 1 (302) as the working scan context for tags 1-11, and that another asset reconciliation is to be performed using tag data 316 through 318, with the working scan context applied for that another asset reconciliation to be defined by cluster 2 (306).

In the above example, the switch is based on frequency of tag additions to the particular contexts, such as relative growth rate as between two or more clusters. Alternatively or additionally, the switch could be time-based. For instance, if a threshold amount of time lapses between addition of tag data from an RFID tag to the working scan context (i.e. to a cluster having scope within the working scan context), the working scan context then becomes 'closed'. A different working scan context can then become eligible for application to newly received tag data. Alternatively, after the working scan context becomes 'closed', the system can simply be returned to a state wherein a new working scan context is to be dynamically determined based on the tag data received going forward.

As noted above, many scan contexts for potential application can be maintained based on maintained clusters for clustering the tag data. Also, a scan context can be based on its own predefined list. For instance, if a predefined asset reconciliation list is initially provided, a corresponding predefined scan context can be determined based on the predefined listed and maintained while the scanner begins the scanning and dynamically determining the proper scan context to apply as the working scan context. If multiple predefined lists are received prior to initiating the scan, multiple contexts can be predefined based thereon. Alternatively or additionally, multiple scan contexts can be automatically generated dynamically as tag data is received. The multiple scan contexts being maintained can serves a candidate scan contexts for switching, wherein the working scan context is switched, where appropriate, from one scan context of the multiple scan contexts to another scan context of the multiple scan contexts.

In addition to the above, the multiple scan contexts and/or clusters (including scope and assets included therein) can be displayed on a display of the RFID reader, and a user can select a scan context or select one or more of the clusters of assets to include in an asset reconciliation. Additionally, the user can select to perform multiple asset reconciliations and identify the contexts to be applied in performing the multiple asset reconciliations. Graphical feedback can thus be provided to the user of the current working scan context and other scan contexts that are being monitored.

The clustering of tag data enables connections to be made between asset properties (e.g., types, sizes, colors, etc.) in an efficient and smart manner in order to define a context for including/excluding assets in an asset reconciliation. In addition, the dynamic nature of the working scan context is useful when a user attempts to locate items. For instance, a sales associate may wish to locate pink pants for a customer. The database may be aware of three pairs of pink jeans of a particular model, in which case a predefined list having thereon the three pink pants of the particular model may be provided to the scanner. The scanner may generate the predefined working scan context based on the list, where the context includes pink jeans of that model. The sales associate may then carry the scanner through the sales floor in an attempt to locate one or more of the three pink pants of the specified model. Assuming that the three pink pants actually do not exist on the sales floor, but that scanner detects, for instance, other models of pink pants on the sales floor, the scanner may dynamically expand the working scan context to include the pink pants that were detected (but not included in the predefined working scan context), and alert the sales associate as to their presence. In this manner, the scanner may intelligently alert an operator to items not known to the database or scanner but that nevertheless appear to fit what the customer is seeking.

Figure 4:
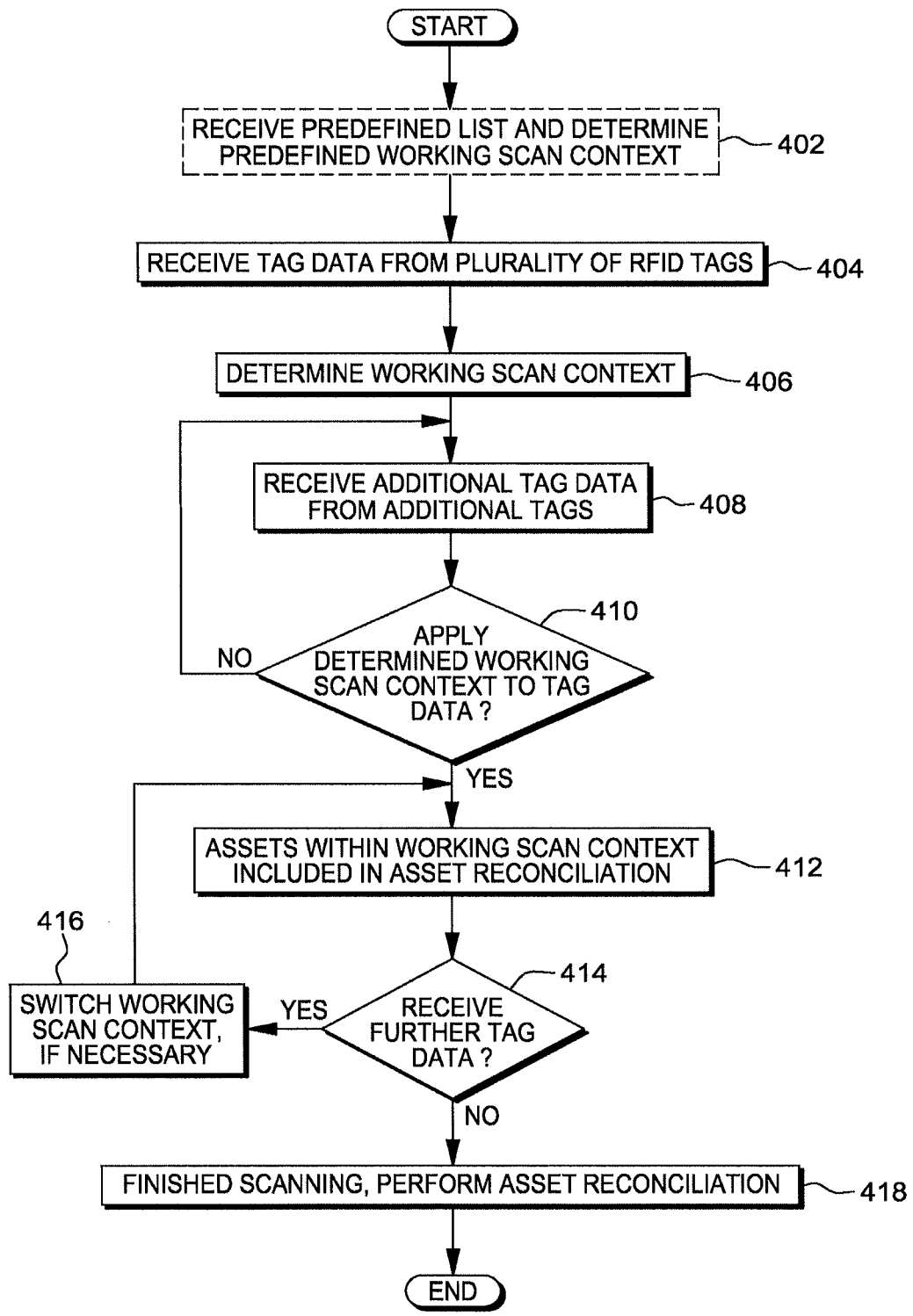
FIG. 4 depicts one example of process to facilitate RFID-based asset reconciliation, in accordance with one or more aspects of the present invention.
Figure 5:
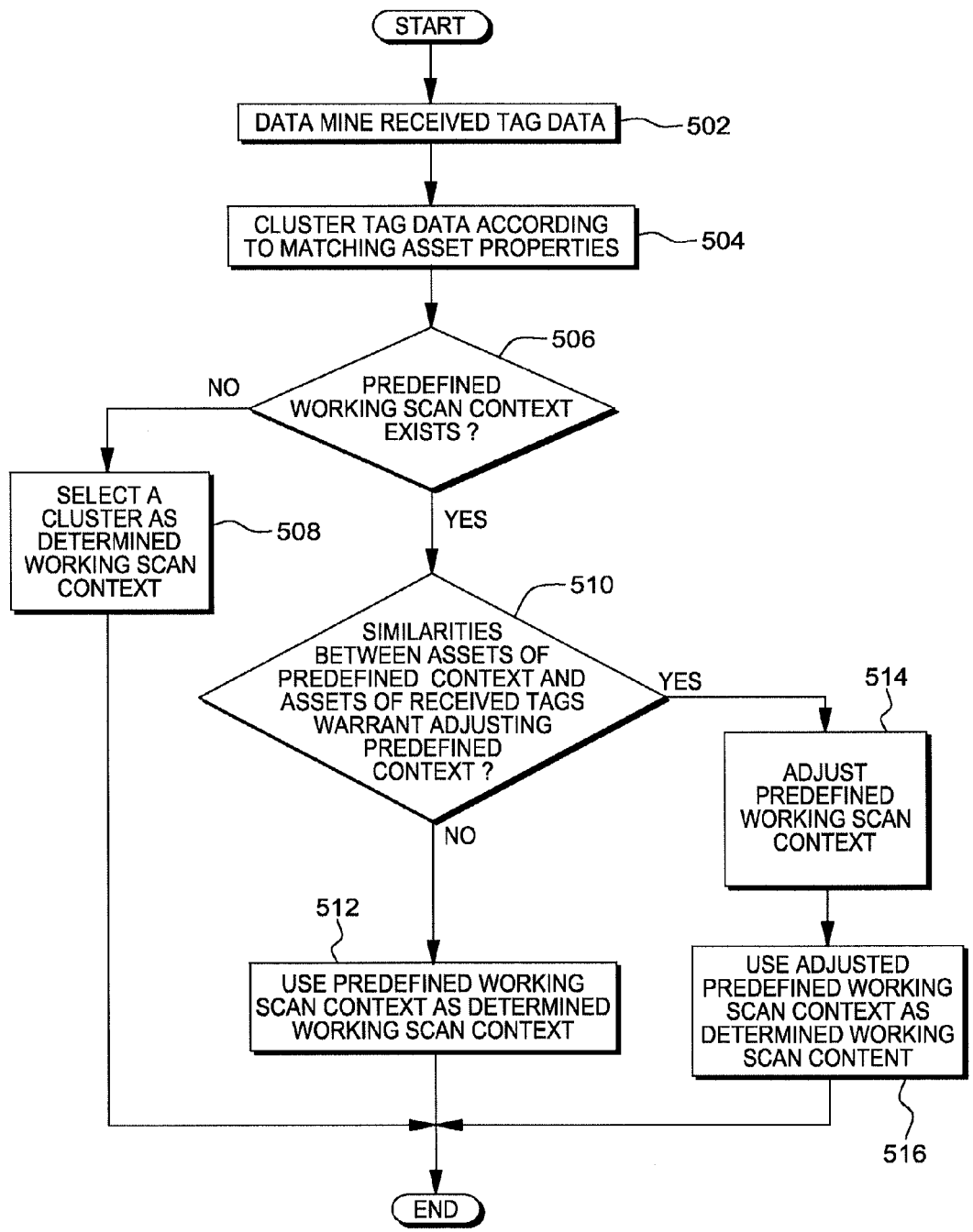
FIG. 5 depicts one example of a process to determine a working scan context, in accordance with one or more aspects of the present invention.
Figure 6:
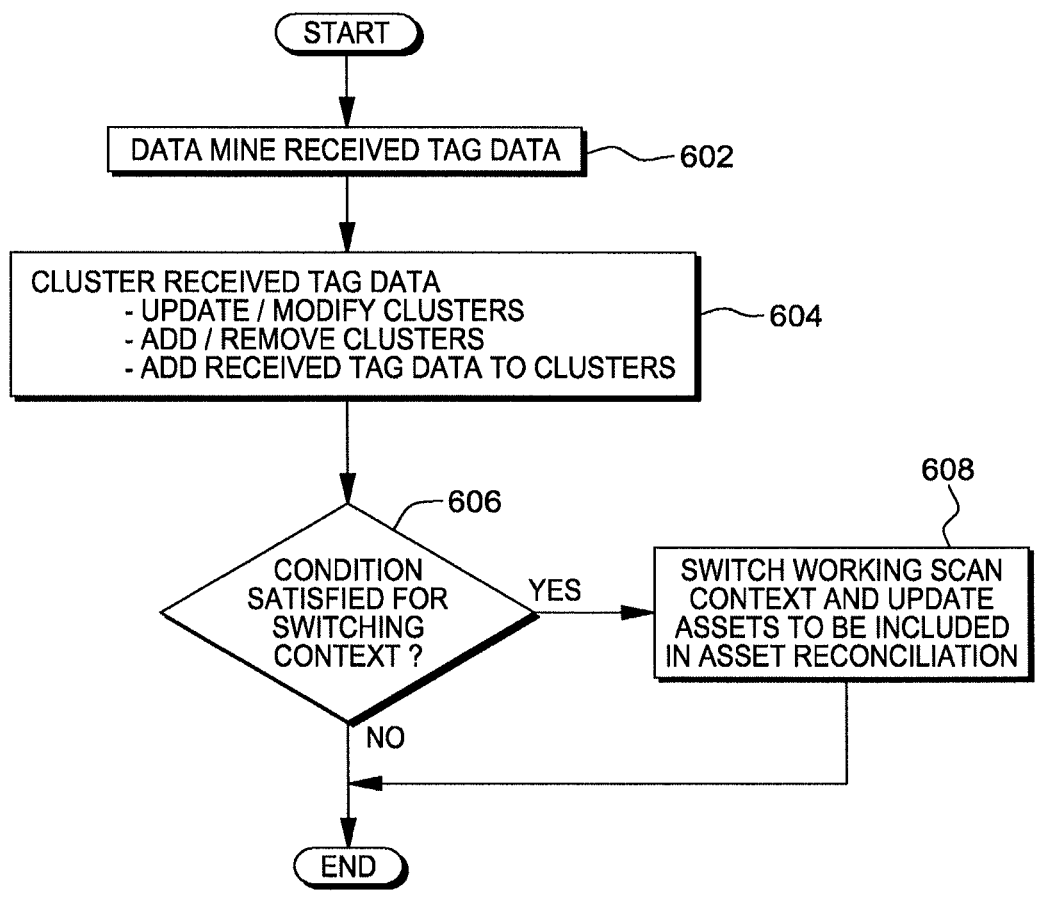
FIG. 6 depicts an example of a process to determine whether to switch a working scan context, in accordance with one or more aspects of the present invention.

FIGS. 4-6 depicts example processes that can be performed by a scanner and/or one or more backend systems, such as a server with which the scanner communicates. In one embodiment, the processing can be performed by executing, by at least one processor, such as one or more processors of a scanner and/or one or more processors of a server, program instructions for performing steps of the processes. FIG. 4 depicts one example of process to facilitate RFID-based asset reconciliation, in accordance with one or more aspects of the present invention. The process begins by optionally receiving one or more predefined asset reconciliation lists and determining predefined working scan context(s) based on the received predefined lists (402). As described above, the predefined lists could be based on some 'starting point' for asset reconciliation or for finding a suitable product on a sales floor, for instance. Next, tag data from a plurality of RFID tags are received (404). Each of the various tag data are clustered into appropriate cluster(s), and some may be left unclustered. At some point, for instance after a threshold number of tag data from RFID tags are received, or after a particular threshold level of confidence is reached that a particular cluster or set of clusters adequately defines a working scan context, a working scan context is dynamically determined (406). Further details of dynamically determining a working scan context are described with reference to FIG. 5. Also, as noted above, multiple working scan contexts can be determined and tracked simultaneously, if desired. Additionally, if a predefined working scan context was received, the dynamically determined working scan context may be the same (if no expansion/modification is found to be necessary) or different (if the scope of the predefined working scan context is found to need adjustment, based on the received tag data).

At some point after the working scan context is dynamically determined, additional tag data from additional RFID tags are received (408), and it is determined whether to apply the determined working scan context to the tag data (410). In one example, this is determined by presenting a user with an option to approve and apply one or more of the determined working scan contexts to the received tag data (which includes the additional tag data as well as the original tag data received prior to determining the working scan context). In one example, the user can identify/select a working scan context to apply to all or some tag data (where each of the tag data are either included or excluded from the context), or can specify which context is to be used for which tag data of the received tag data (for instance, which contexts to apply to which tag data, if multiple contexts are to be applied, for instance for differing asset reconciliations). In another example, a working scan context is automatically applied to the received tag data when the confidence that the particular working scan context is accurate is above a predefined threshold.

If at 410 it is determined not to apply a working scan context, then the process returns to 408 with receiving additional tag data. Otherwise, the assets (represented by the tag data) that fall within the applied context are included in an asset reconciliation, the scope of coverage of which is defined by that context (412).

Next, it is determined whether further tag data is received from further RFID tags. Since a working scan context could be applied during a scan (rather than, for instance, at the conclusion of the scan), further tag data can be received subsequent to applying the working scan context. If further tag data is received, a context switch may be performed, if necessary (416). Further details of determining whether a context switch is to be performed are provided with reference to FIG. 6, below. In one example, the context switch occurs when a present context is determined to no longer be applicable. For instance, the newly received data may indicate that the previous working scan context was improperly defined, or, alternatively, may indicate that the previous scan context is to define the scope of coverage of assets for a first asset reconciliation, and the more recently received tag data corresponds to assets against which a different scan context is to apply for another asset reconciliation that is to be performed.

In any case, if further tag data should be received (414), and regardless whether the context is switched, the process returns to 412, wherein the inclusion/exclusion of assets in the asset reconciliation is performed. Thus, if the working scan context was not switched, then the newly received tag data is simply categorized/clustered, and the assets thereof are included in or excluded from the asset reconciliation. If, instead, the context was switched, then the newly received tag data will be categorized/clustered according to the updated working scan context.

If it is instead determined that no further tag data are received, then scanning has finished and asset reconciliation is performed (418). Asset reconciliation, in one example, updates the inventory database(s) with proper counts for assets included in the asset reconciliation. In some examples, this involves two-way asset reconciliation in which not only are counts for existing assets in the database updated, but counts for additional assets, not in the database but included within the asset reconciliation based on similarities in asset properties, are also reconciled with the database through the addition of the asset and count thereof to the database. In performing the asset reconciliation, assets included in the working scan context are reconciled, which assets include assets represented in tag data received both before and after the working scan context was established.

FIG. 5 depicts one example of a process to determine a working scan context, in accordance with one or more aspects of the present invention. The working scan context is determined by identifying commonality between assets represented in tag data. The process begins by data mining received tag data (502) and clustering the tag data according to matching properties of assets represented therein (504). Those having ordinary skill in the art will recognize various techniques for performing data mining on the received tag data. Tag data indicates various properties of assets represented by the tag data. For instance, an RFID tag on a particular pair of jeans may contain tag data that indicates, by way of an Electronic Product Code for instance, properties describing the jeans, such as the product category (jeans), waist size, inseam size, color, fit type, as well as the unique serial number assigned that the particular pair of jeans. The data mining can extract such information from the tag data received from the RFID tags. Commonality among the assets represented by the tag data can be identified by identifying matching asset properties thereof indicated in the tag data.

After the received tag data is data mined and clustered, it is determined whether a predefined working scan context exists (506). If not, then one or more clusters are selected as the dynamically determined working scan context (508). In some cases, a single cluster will be selected, while in other cases, multiple clusters will be selected to define the scope of the working scan context. The difference is largely a function of the granularity to which the clusters of assets are maintained. For instance, assume that separate clusters are maintained for size 34 jeans and size 36 jeans (finer granularity), but that the working scan context is to include both categories. Then, both clusters will form the working scan context. Instead, if the system allowed dynamic redefinition of the clusters, then the two clusters could instead simply be merger into a single cluster—'size 34 or 36 jeans' (coarser granularity), in which case the working scan context would simply include the one cluster encompassing both sizes. In any case, the selected cluster(s) form the determined working scan context, and the process ends.

If, however, a predefined working scan context exists, then it is determined whether the predefined working scan context is to be adjusted to more appropriately define the scope of coverage of assets for the context. In the example of FIG. 5, similarities between the assets covered by the predefined context and the assets represented in the received tag data are examined to determine whether an adjustment to the predefined working scan context is warranted (510). If not, then the predefined working scan context is used as the determined working scan context (512). Otherwise, a new working scan context, which is an adjusted version of the predefined working scan context, is developed (514), for instance based on the clustering (504) that occurred. The adjusted predefined working scan context is then used as the dynamically determined working scan context (516), and the process ends.

FIG. 6 depicts an example of a process to determine whether to switch a working scan context, in accordance with one or more aspects of the present invention. A context switch may occur after a current working scan context is deemed to be 'expired'—that is, if a predefined timeout (say, 30 seconds) has elapsed between addition of tag data to the cluster(s) of the present working scan context. Alternatively or additionally, multiple potential working scan contexts can be maintained (i.e. by maintaining multiple different clusters), and the growth rates of the different clusters can be monitored. If the cluster(s) of the current working scan context are no longer growing and/or cluster(s) of a different (potential) context are growing at a threshold faster rate than those of the current context, then it may be determined to switch to this different context.

Referring to FIG. 6, data mining is performed on received tag data (602). As a result of the data mining, the received tag data will be clustered (604), which may include adding the received tag data to existing clusters, updating or modifying the definition of the clusters (for instance to expand their scope to cover new asset properties of the received tag data), and/or adding new or removing old/unused clusters.

Next, it is determined whether conditions are satisfied for switching the working scan context (606). This can be based on, for instance, cluster growth rates and/or time-outs as described above. As an example, the different working context could correspond to a different cluster of the multiple clusters that are being maintained. Additionally, the conditions could include verification by the user, responsive to a prompt, that a context switch is to be performed.

If a switch is to be performed, then the working scan context is switched to the new context, and the identification of assets to be included in the asset reconciliation are updated. For instance, if the switch is to mark the end of a previous asset reconciliation and the start of a new one, then the assets represented in the tag data received prior to the cutoff for the switch are used with the prior working scan context to identify appropriate assets for inclusion in and exclusion from the previous asset reconciliation. Similarly, the assets represented in the tag data received after to the cutoff for the switch are used with the new working scan context to identify appropriate assets for inclusion in and exclusion from the next asset reconciliation.

If, instead, the switch is to be performed simply to redefine the context for the present asset reconciliation (rather than end the present and start a new reconciliation), then the assets to be included in the asset reconciliation are updated based on the new (switch-to) working scan context. This may include, for instance, redefining the scope of coverage of the cluster(s) being maintained and reassigning previously received tag data to the (redefined) cluster(s) according to the redefined scope of coverage of the clusters. Thereafter, or if it was determined that the conditions for switching the context were not satisfied, the process ends.

In accordance with aspects of the invention, once a context is established, a system (such as a scanner acquiring tag data, or a backend server) can "intelligently" filter out unrelated items and avoid unintentional inclusion of assets in asset reconciliations. This advantageously provides great improvement over current RFID operations in which inclusion of assets in an asset reconciliation is based solely on a priori knowledge of the tag data to be acquired, and where the tag data is included en masse in the asset reconciliation, thereby potentially including assets not intended to be reconciled.

The ability to dynamically set a working scan context enables a scan to acquire the appropriate asset tag data absent having to set the context ahead of time (i.e. absent a requirement to preconfigure the system with the appropriate information to know which tag data to filter and which not to, for instance via lists of Electronic Product Codes). This advantageously provides flexibility in scanning many potentially unrelated assets at a time. A logical and intuitive categorization of assets in an easy-to-display form enables users to easily find particular items and/or visualize assets to be included in an asset reconciliation. Prior RFID techniques conventionally require having a priori knowledge of, e.g., EPC codes, and relying on this information to search for/include an item.

Aspects of the present invention advantageously enable connections to be made between assets traits (e.g., types, sizes, colors, etc.) in an efficient and intelligent manner in order to dynamically determine a context for determining relevant assets for a user or system. For example, in a case where there are two adjacent clothing racks housing two different types of items (e.g. jeans on rack 1 and shirts on rack 2), and a user wishes to take inventory of the rack with jeans, he/she can simply begin scanning that rack of jeans. The system (e.g. RFID reader or backed server) will immediately data mine and make logical connections between asset properties based on, e.g., collected EPC numbers, to generate a working context of what the user is attempting to scan (in this case, jeans). This context can then be applied, automatically or manually, by a user to prevent the reader from reconciling EPCs from, for instance, shirts either (i) misplaced on rack 1, or (ii) inadvertently detected from rack 2, since the dynamically determined context's scope of coverage will not extend to the shirts.

In addition, aspects of the present invention advantageously facilitate searching for particular items (using a predefined list of assets from an asset database to predefine a context and thereby narrow down a search) from a user's perspective. Such an approach allows for an intuitive user interface for choosing particular items, filtered by any user-defined criteria.

Figure 7A:
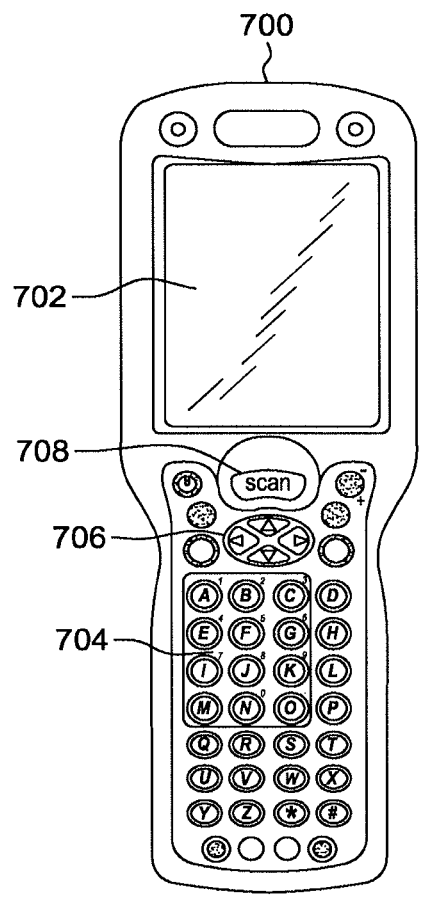
FIGS. 7A-7B depict perspective drawings of one example of a portable data terminal to incorporate and use one or more aspects of the present invention.
Figure 7B:
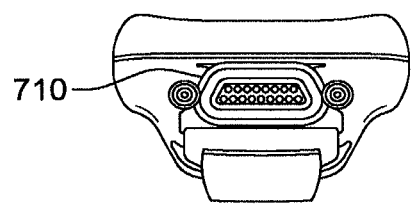

Further examples of a portable data terminal to incorporate and use one or more aspects of the present invention are now provided. In one example, such example RFID readers comprise a computer system to incorporate or use one or more aspects of the present invention. FIGS. 7A-7B depict perspective drawings of one example of a portable data terminal, in accordance with one or more aspects of the present invention. FIG. 7A shows a front perspective view and FIG. 7B shows a bottom perspective view. As shown, the portable data terminal 700 includes interface elements including a display 702, a keyboard 704, interface buttons 706 for example for positioning a cursor, and an actuator 708.

In addition, portable data terminal 700 includes an RFID tag reader (not pictured) embedded therein, or connected to portable data terminal 700 via peripheral interface 710. Peripheral interface 710 could comprises, as examples, a dial-up or cable modem interface, a USB interface, a PCM-CIA interface, an Ethernet interface, a RS232 interface, an IBM Tailgate Interface RS485 interface, a CompactFlash interface, a PC Card Standard interface, a Secure Digital standard for memory interface, a Secure Digital Input Output for input/output devices interface and/or any other appropriate standard or proprietary device interface. In various embodiments peripheral interface 710 can be used as part of attaching computer peripherals.

Figure 8:
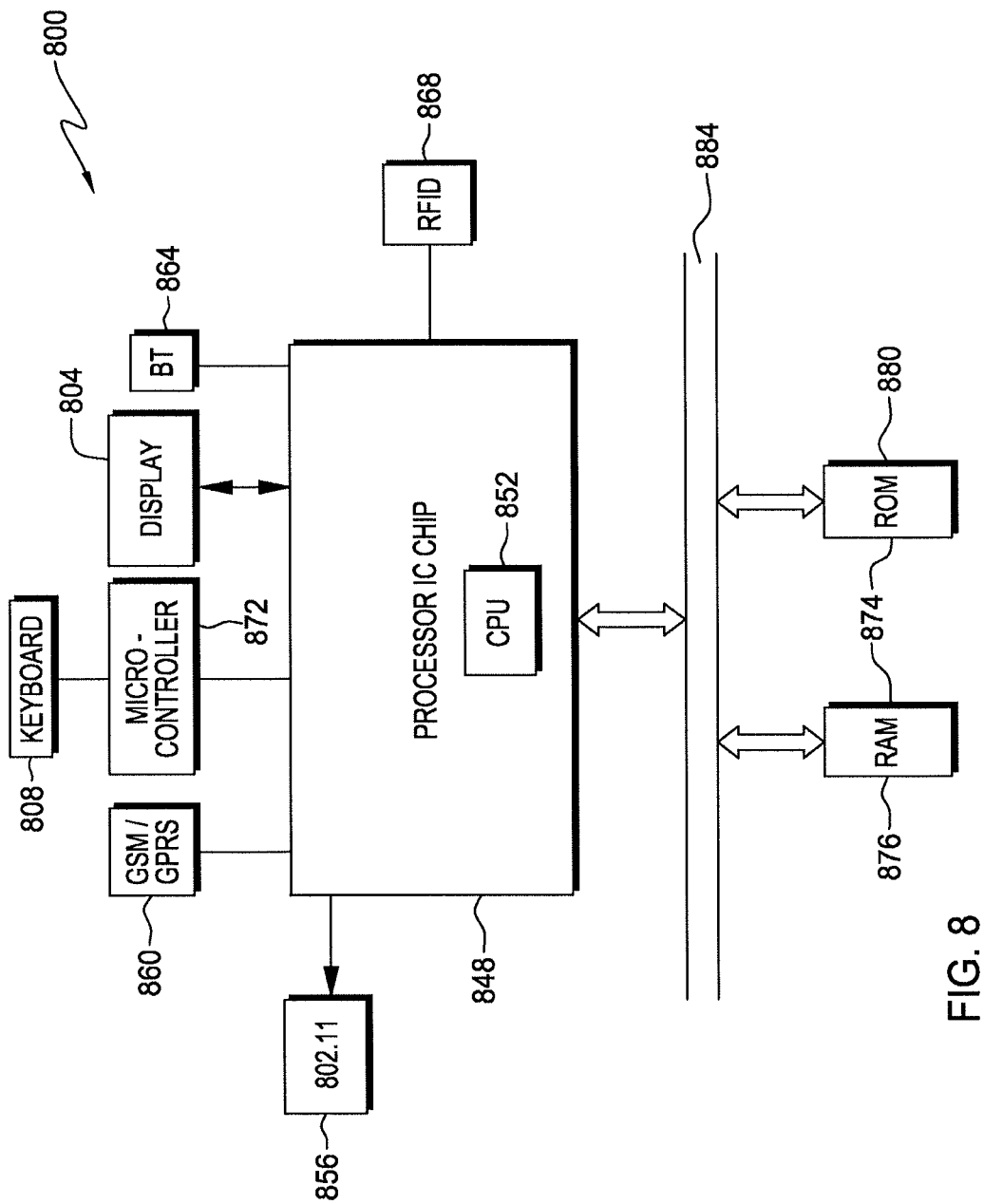
FIG. 8 depicts an example block diagram of one example of a portable data terminal to incorporate and use one or more aspects of the present invention.

FIG. 8 depicts an example block diagram of one example of a portable data terminal to incorporate and use one or more aspects of the present invention. In the embodiment of FIG. 8, the portable data terminal 800 includes a processor integrated circuit (IC) chip 848 such as may be provided by, for example, an INTEL® Strong ARM RISC processor or an INTEL® PXA255 Processor (INTEL is a registered trademark of Intel Corporation, Santa Clara, Calif., USA). Processor IC chip 848 includes a central processing unit (CPU) 852. As indicated above, the portable data terminal 800 may include a display 804, such as a liquid crystal display, a keyboard 808, a plurality of communication or radio transceivers such as a 802.11 radio communication link 856, a Global System for Mobile Communications/General Packet Radio Service (GSM/GPRS) radio communication link 860, and/or a Bluetooth® radio communication link 864 (Bluetooth® is a registered trademark of Bluetooth Special Interest Group, Kirkland, Wash., USA). In additional embodiments, the portable data terminal 800 may also have the capacity to transmit information such as voice or data communications via Code Division Multiple Access (CDMA), Cellular Digital Packet Data (CDPD), Mobitex cellular phone and data networks and network components. In other embodiments, the portable data terminal 800 can transmit information using a DataTAC™ network or a wireless dial-up connection.

The keyboard 808 may communicate with IC chip 848 via microcontroller chip 872. The portable data terminal 800 further includes a memory 874 including a volatile memory and a non-volatile memory. The volatile memory in one embodiment is provided in part by a RAM 876. The non-volatile memory may be provided in part by flash ROM 880. Processor IC chip 548 is in communication with the RAM 876 and ROM 880 via a system bus 884. Processor IC chip 848 and microcontroller chip 872 also include areas of volatile and non-volatile memory. In various embodiments where at least some aspects of the present invention are implemented at least in part in software, the software components can be stored in the memory 874. In one embodiment, the processor IC chip 848 includes a control circuit that itself employs the CPU 852 and memory 874. Non-volatile areas of the memory 874 can be used, for example, to store program operating instructions.

In various embodiments, the processor IC chip 848 may include a number of I/O interfaces (not all shown in FIG. 8) including several serial interfaces (e.g., general purpose, Ethernet, blue tooth), and parallel interfaces (e.g., PCMCIA, Compact Flash).

The portable data terminal also includes RFID module 868. In some embodiments, the RFID module 868 is an ISO/IEC 14443 compliant RFID interrogator and reader that can interrogate a RFID contactless device and that can recover the response that a RFID tag emits. The International Organization for Standardization (ISO) and the International Electrotechnical Commission (IEC) are bodies that define the specialized system for worldwide standardization. In other embodiments, the RFID module 868 operates in accordance with ISO/IEC 10536, or ISO/IEC 15963. Contactless Card Standards promulgated by ISO/IEC cover a variety of types as embodied in ISO/IEC 10536 (Close coupled cards), ISO/IEC 14443 (Proximity cards), and ISO/IEC 15693 (Vicinity cards). These are intended for operation when very near, nearby and at a longer distance from associated coupling devices, respectively.

In some embodiments, the RFID module 868 is configured to read tags that comprise information recorded in accordance with the Electronic Product Code (EPC) format. In some embodiments, the RFID module 868 operates according to a proprietary protocol. In some embodiments, the RFID module 868 communicates at least a portion of the information received from an interrogated RFID tag to a computer processor (e.g. processor IC chip 848 and/or CPU 852) that uses the information to access or retrieve data stored on a server accessible via a network, such as the Internet. In some embodiments, the information is a serial number of the RFID tag or of the object associated with the RFID tag. In one example, the computer processor transfers the received tag data to memory 874 for further processing, storage, and/or provision to other components, such as a backend server.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RE, etc., or any suitable combination of the foregoing.

Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on a system, partially on the system and partially on a remote system, or entirely on the remote computer or server. In the latter scenario, the remote system may be connected to the system through any type of network, including a local area network (LAN) or a wide area network (WAN), or the connection may be made to an external computer (for example, through the Internet using an Internet Service Provider).

Figure 9:
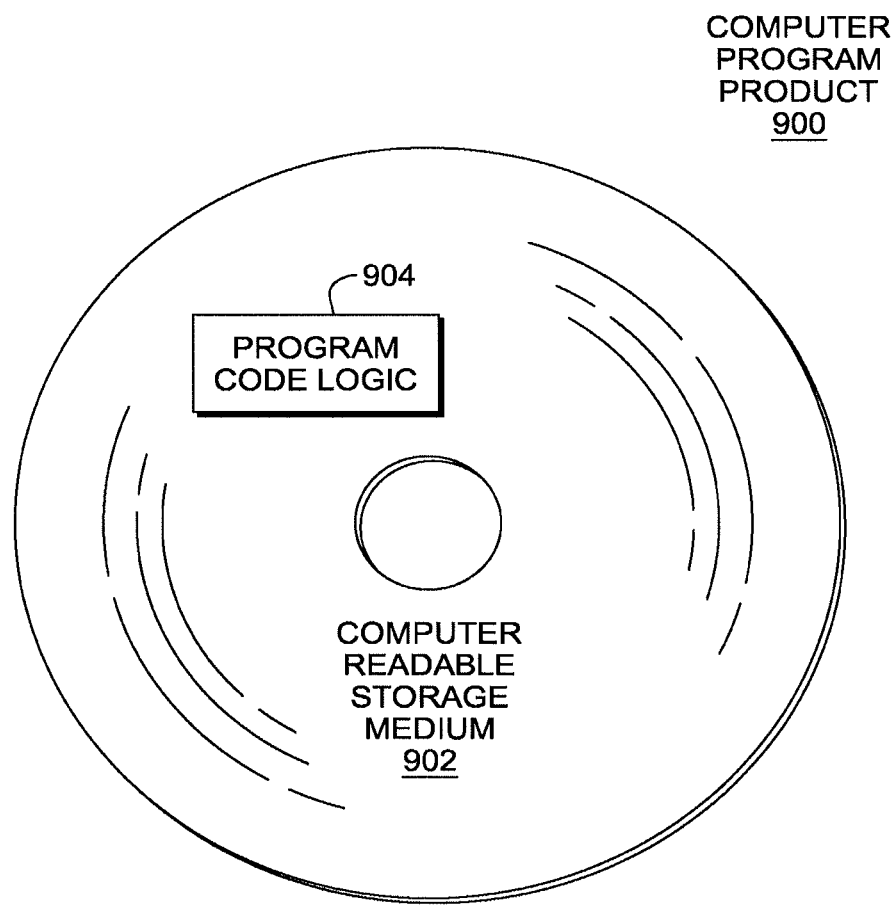
FIG. 9 depicts one example of a computer program product to incorporate one or more aspects of the present invention.

Referring now to FIG. 9, in one example, a computer program product 900 includes, for instance, one or more computer readable media 902 to store computer readable program code means or logic 904 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

A small sample of methods, systems, and computer program products that are described herein are as follows:

A1. A method for facilitating radio frequency identification-based asset reconciliation, the method comprising: receiving tag data from a plurality of radio frequency identification tags carrying the tag data, the tag data representative of a plurality of assets; dynamically determining, by at least one processor, based on the tag data of the plurality of radio frequency identification tags, a working scan context, the working scan context defining a scope of coverage of assets to be included in an asset reconciliation; subsequent to the dynamically determining, receiving additional tag data from one or more additional radio frequency identification tags carrying the additional tag data, the additional tag data representative of one or more additional assets; and applying the dynamically determined working scan context to the additional tag data from the one or more additional radio frequency identification tags, the applying automatically identifying which assets of the one or more additional assets are to be included in the asset reconciliation, wherein responsive to the tag data of a radio frequency identification tag of the one or more additional radio frequency identification tags being representative of an asset within the scope of coverage defined by the working scan context, the asset is included in the asset reconciliation.

A2. The method of A1, wherein responsive to the tag data of another radio frequency identification tag of the one or more additional radio frequency identification tags being representative of an asset not within the scope of coverage defined by the working scan context, the asset is excluded from inclusion in the asset reconciliation.

A3. The method of A1, wherein tag data of each radio frequency identification tag of the plurality of radio frequency identification tags comprises indications of asset properties of the asset represented by the tag data of the respective radio frequency identification tag, and wherein dynamically determining the working scan context comprises identifying, based on the indications of asset properties in the tag data of the plurality of radio frequency identification tags, commonality between multiple assets of the plurality of assets.

A4. The method of A3, wherein the identifying commonality comprises: performing data mining on the tag data from the plurality of radio frequency identification tags to identify the indications of asset properties thereof; clustering tag data from radio frequency identification tags of the plurality of radio frequency identification tags according to at least one matching identified indication of asset properties, to form at least one cluster of tag data from radio frequency identification tags of the plurality of radio frequency identification tags; and selecting a cluster from the at least one cluster, wherein the dynamically determined working scan context comprises the selected cluster.

A5. The method of A4, wherein the matching indication of asset properties comprises a matching global trade item number encoded in the tag data.

A6. The method of A4, wherein the matching indication of asset properties includes matching information determined from a global trade item number encoded in the tag data, wherein the matching information indicates at least one of: a matching Universal Product Code, a matching European Article Number, a matching asset manufacturer, or a matching product type.

A7. The method of A4, wherein the selected cluster comprises a cluster of the at least one cluster having a greatest number of assets represented by tag data therein.

A8. The method of A4, further comprising, subsequent to the applying, receiving tag data from further radio frequency identification tags; performing data mining on the tag data from the further radio frequency identification tags and clustering tag data from radio frequency identification tags of the further radio frequency identification tags according to at least one matching identified indication of asset properties, wherein the received tag data from the further radio frequency identification tags are added to at least one of: a cluster of the one or more clusters or a newly formed cluster; and dynamically switching the working scan context to a different working scan context, based on the received tag data from the further radio frequency identification tags, the dynamically switching being responsive to satisfying a condition for switching the working scan context.

A9. The method of A8, wherein the condition for switching the working scan context comprises reaching a threshold amount of time since tag data from a radio frequency identification tag was added to the selected cluster, wherein the dynamically switching comprises switching the working scan context responsive to determining that no tag data was added to the selected cluster within the threshold amount of time, and wherein the different working scan context comprises a different cluster than the selected cluster, the different cluster being a cluster of the one or more clusters or the newly formed cluster.

A10. The method of A8, wherein the condition for switching the working scan context comprises a growth rate of a different cluster than the selected cluster exceeding a growth rate of the selected cluster by a threshold difference in growth rates, the different cluster being a cluster of the one or more clusters or the newly formed cluster, wherein the dynamically switching comprises switching the working scan context responsive to determining that the growth rate of the different cluster exceeds the growth rate of the selected cluster by at least the threshold difference in growth rates, and wherein the different working scan context comprises the different cluster.

A11. The method of A1, wherein applying the dynamically determined working scan context comprises determining a confidence level for the dynamically determined working scan context, the confidence level indicating a level of confidence that the dynamically determined working scan context is to be applied, and automatically applying the dynamically determined working scan context responsive to the confidence level exceeding a predefined threshold confidence level.

A12. The method of A1, wherein applying the dynamically determined working scan context comprises presenting to a user the working scan context for approval, and receiving input from the user indicating that the working scan context is to be applied.

A13. The method of A1, further comprising: receiving a predefined asset reconciliation list comprising a list of assets to be included in the asset reconciliation; and predefining, based on the received predefined asset reconciliation list, a working scan context prior to receiving the tag data of the plurality of radio frequency identification tags, the predefined working scan context based on assets reflected in the predefined asset reconciliation list, the assets in the predefined asset reconciliation list being assets in a database against which the asset reconciliation is to be performed, wherein the predefined working scan context defines a scope of coverage of assets reflected in the database, and wherein the dynamically determined working scan context is based, at least in part, on the predefined working scan context.

A14. A system for facilitating radio frequency identification-based asset reconciliation, the system comprising: a memory; and a processor, in communication with the memory, wherein the system is configured to perform: receiving tag data from a plurality of radio frequency identification tags carrying the tag data, the tag data representative of a plurality of assets; dynamically determining, based on the tag data of the plurality of radio frequency identification tags, a working scan context, the working scan context defining a scope of coverage of assets to be included in an asset reconciliation; subsequent to the dynamically determining, receiving additional tag data from one or more additional radio frequency identification tags carrying the additional tag data, the additional tag data representative of one or more additional assets; and applying the dynamically determined working scan context to the additional tag data from the one or more additional radio frequency identification tags, the applying automatically identifying which assets of the one or more additional assets are to be included in the asset reconciliation, wherein responsive to the tag data of a radio frequency identification tag of the one or more additional radio frequency identification tags being representative of an asset within the scope of coverage defined by the working scan context, the asset is included in the asset reconciliation.

A15. The system of A14, wherein tag data of each radio frequency identification tag of the plurality of radio frequency identification tags comprises indications of asset properties of the asset represented by the tag data of the respective radio frequency identification tag, and wherein dynamically determining the working scan context comprises identifying, based on the indications of asset properties in the tag data of the plurality of radio frequency identification tags, commonality between multiple assets of the plurality of assets, wherein the identifying commonality comprises: performing data mining on the tag data from the plurality of radio frequency identification tags to identify the indications of asset properties thereof; clustering tag data from radio frequency identification tags of the plurality of radio frequency identification tags according to at least one matching identified indication of asset properties, to form at least one cluster of tag data from radio frequency identification tags of the plurality of radio frequency identification tags; and selecting a cluster from the at least one cluster, wherein the dynamically determined working scan context comprises the selected cluster.

A16. The system of A15, wherein the matching indication of asset properties comprises at least one of: a matching global trade item number encoded in the tag data, a matching Universal Product Code derived from the global trade item number encoded in the tag data, a matching European Article Number derived from the global trade item number encoded in the tag data, a matching asset manufacturer derived from the global trade item number encoded in the tag data, or a matching product type derived from the global trade item number encoded in the tag data.

A17. The system of A15, wherein the system is further configured to perform, subsequent to the applying: receiving tag data from further radio frequency identification tags; performing data mining on the tag data from the further radio frequency identification tags and clustering tag data from radio frequency identification tags of the further radio frequency identification tags according to at least one matching identified indication of asset properties, wherein the received tag data from the further radio frequency identification tags are added to at least one of: a cluster of the one or more clusters or a newly formed cluster; and dynamically switching the working scan context to a different working scan context, based on the received tag data from the further radio frequency identification tags, the dynamically switching being responsive to satisfying a condition for switching the working scan context.

A18. A computer program product for facilitating radio frequency identification-based asset reconciliation, the computer program product comprising: a non-transitory storage medium readable by at least one processor and storing executable instructions for execution by the at least one processor to facilitate performing: receiving tag data from a plurality of radio frequency identification tags carrying the tag data, the tag data representative of a plurality of assets; dynamically determining, based on the tag data of the plurality of radio frequency identification tags, a working scan context, the working scan context defining a scope of coverage of assets to be included in an asset reconciliation; subsequent to the dynamically determining, receiving additional tag data from one or more additional radio frequency identification tags carrying the additional tag data, the additional tag data representative of one or more additional assets; and applying the dynamically determined working scan context to the additional tag data from the one or more additional radio frequency identification tags, the applying automatically identifying which assets of the one or more additional assets are to be included in the asset reconciliation, wherein responsive to the tag data of a radio frequency identification tag of the one or more additional radio frequency identification tags being representative of an asset within the scope of coverage defined by the working scan context, the asset is included in the asset reconciliation.

A19. The computer program product of A18, wherein tag data of each radio frequency identification tag of the plurality of radio frequency identification tags comprises indications of asset properties of the asset represented by the tag data of the respective radio frequency identification tag, and wherein dynamically determining the working scan context comprises identifying, based on the indications of asset properties in the tag data of the plurality of radio frequency identification tags, commonality between multiple assets of the plurality of assets, wherein the identifying commonality comprises: performing data mining on the tag data from the plurality of radio frequency identification tags to identify the indications of asset properties thereof; clustering tag data from radio frequency identification tags of the plurality of radio frequency identification tags according to at least one matching identified indication of asset properties, to form at least one cluster of tag data from radio frequency identification tags of the plurality of radio frequency identification tags; and selecting a cluster from the at least one cluster, wherein the dynamically determined working scan context comprises the selected cluster.

A20. The computer program product of A19, wherein the matching indication of asset properties comprises at least one of: a matching global trade item number encoded in the tag data, a matching Universal Product Code derived from the global trade item number encoded in the tag data, a matching European Article Number derived from the global trade item number encoded in the tag data, a matching asset manufacturer derived from the global trade item number encoded in the tag data, or a matching product type derived from the global trade item number encoded in the tag data.

A21. A method for facilitating radio frequency identification-based asset reconciliation, the method comprising: receiving a predefined asset reconciliation list comprising a list of assets to be included in the asset reconciliation; determining, by at least one processor, a working scan context based on the list of assets of the predefined asset reconciliation list, the working scan context defining a scope of coverage of assets to be included in the asset reconciliation; subsequent to the determining, receiving tag data from one or more radio frequency identification tags carrying the tag data, the tag data representative of one or more assets; and applying the determined working scan context to the tag data from the one or more radio frequency identification tags, the applying automatically identifying which assets of the one or more assets are to be included in the asset reconciliation, wherein responsive to the tag data of a radio frequency identification tag of the one or more radio frequency identification tags being representative of an asset within the scope of coverage defined by the working scan context, the asset is included in the asset reconciliation.

A22. The method of A21, wherein determining the working scan context comprises defining at least one cluster for performing clustering on the received tag data based on a matching indication of asset properties indicated in tag data, wherein the matching indication of asset properties comprises at least one of: a global trade item number encoded in the tag data, a Universal Product Code derived from the global trade item number encoded in the tag data, a European Article Number derived from the global trade item number encoded in the tag data, an asset manufacturer derived from the global trade item number encoded in the tag data, or a product type derived from the global trade item number encoded in the tag data.

A23. The method of A21, wherein determining the working scan context comprises defining at least one cluster for performing clustering of the received tag data based on a matching indication of asset properties indicated in received tag data, wherein the matching indication of asset properties comprises at least one of: a manager number encoded in the tag data, an object class encoded in the tag data, a Universal Product Code derived from the manager number and object class encoded in the tag data, a European Article Number derived from the manager number and object class encoded in the tag data, an asset manufacturer derived from the manager number encoded in the tag data, or a product type derived from the object class encoded in the tag data.

A24. A method for facilitating radio frequency identification-based asset reconciliation, the method comprising: receiving a predefined asset reconciliation list comprising a list of assets to be included in the asset reconciliation; determining, by at least one processor, a first scan context, based on the list of assets of the predefined asset reconciliation list, the first scan context defining a first scope of coverage of assets to be included in the asset reconciliation; receiving tag data from a plurality of radio frequency identification tags carrying the tag data, the tag data representative of a plurality of assets; determining, by the at least one processor, based on the tag data of the plurality of radio frequency identification tags, a second scan context, the second scan context defining a second scope of coverage of assets to be included in the asset reconciliation; selecting one of the first scan context or the second scan context as a working scan context for applying to the received tag data from the plurality of radio frequency identification tags to automatically identify which assets of the plurality of assets are to be included in the asset reconciliation; and maintaining the other scan context of the first scan context or the second scan context as a candidate scan context for dynamically switching the working scan context, responsive to satisfying a condition for switching the working scan context, based on tag data received from further radio frequency identification tags.

A25. The method of A23, wherein determining at least one of the first scan context or the second scan context comprises defining at least one cluster for clustering the received tag data based on a matching indication of asset properties indicated in tag data, wherein the matching indication of asset properties comprises at least one of: a global trade item number encoded in the tag data, a Universal Product Code derived from the global trade item number encoded in the tag data, a European Article Number derived from the global trade item number encoded in the tag data, an asset manufacturer derived from the global trade item number encoded in the tag data, or a product type derived from the global trade item number encoded in the tag data.

A26. The method of A23, wherein determining at least one of the first scan context or the second scan context comprises defining at least one cluster for performing clustering of the received tag data based on a matching indication of asset properties indicated in received tag data, wherein the matching indication of asset properties comprises at least one of: a manager number encoded in the tag data, an object class encoded in the tag data, a Universal Product Code derived from the manager number and object class encoded in the tag data, a European Article Number derived from the manager number and object class encoded in the tag data, an asset manufacturer derived from the manager number encoded in the tag data, or a product type derived from the object class encoded in the tag data.

What is claimed is:

1. A method for asset reconciliation, comprising:
    receiving tag data from a plurality of radio frequency identification tags carrying the tag data, the tag data representative of a plurality of assets;
    identifying characteristics about each of the plurality of assets based on at least a portion of each respective tag data;
    grouping a first plurality of assets based on a common characteristic of the first plurality of assets identified in each respective tag data;
    receiving additional tag data from one or more additional radio frequency identification tags associated with one or more additional assets having at least one characteristic; and
    identifying which assets of the one or more additional assets are to be included in the first plurality of assets when the common characteristic is included within the additional tag data of the one or more additional assets; and
    dynamically switching the first plurality of assets to a different grouping of assets, based on the received tag data from the one or more additional radio frequency identification tags, the dynamically switching being responsive to satisfying a condition for switching the first plurality of assets.

2. The method of claim 1, wherein responsive to the tag data of another radio frequency identification tag of the one or more additional radio frequency identification tags being representative of an asset not within a scope of coverage defined by the first plurality of assets, the asset is excluded from inclusion in the asset reconciliation.

3. The method of claim 1, wherein tag data of each radio frequency identification tag of the plurality of radio frequency identification tags comprises indications of asset properties of the asset represented by the tag data of the respective radio frequency identification tag, and wherein identifying characteristics about each of the plurality of assets comprises identifying, based on the indications of asset properties in the tag data of the plurality of radio frequency identification tags, commonality between multiple assets of the plurality of assets.

4. The method of claim 3, wherein the identifying commonality comprises:
    performing data mining on the tag data from the plurality of radio frequency identification tags to identify the indications of asset properties thereof;
    clustering tag data from radio frequency identification tags of the plurality of radio frequency identification tags according to at least one matching indication of asset properties, to form at least one cluster of tag data from radio frequency identification tags of the plurality of radio frequency identification tags; and
    selecting a cluster from the at least one cluster, wherein the first plurality of assets comprises the selected cluster.

5. The method of claim 4, wherein the matching indication of asset properties comprises a matching global trade item number encoded in the tag data.

6. The method of claim 4, wherein the matching indication of asset properties includes matching information determined from a global trade item number encoded in the tag data, wherein the matching information indicates at least one of: a matching Universal Product Code, a matching European Article Number, a matching asset manufacturer, or a matching product type.

7. The method of claim 4, wherein the selected cluster comprises a cluster of the at least one cluster having a greatest number of assets represented by tag data therein.

8. The method of claim 4, further comprising, subsequent to the identifying which assets of the one or more additional assets are to be included in the first plurality of assets:
    receiving tag data from further radio frequency identification tags;
    performing data mining on the tag data from the further radio frequency identification tags and clustering tag data from radio frequency identification tags of the further radio frequency identification tags according to at least one matching identified indication of asset properties, wherein the received tag data from the further radio frequency identification tags are added to at least one of: a cluster of the one or more clusters or a newly formed cluster; and
    dynamically switching the first plurality of assets to a different grouping of assets, based on the received tag data from the further radio frequency identification tags, the dynamically switching being responsive to satisfying a condition for switching the first plurality of assets.

9. The method of claim 8, wherein the condition for switching the first plurality of assets comprises reaching a threshold amount of time since tag data from a radio frequency identification tag was added to the selected cluster, wherein the dynamically switching comprises switching the first plurality of assets responsive to determining that no tag data was added to the selected cluster within the threshold amount of time, and wherein the different grouping of assets comprises a different cluster than the selected cluster, the different cluster being a cluster of the one or more clusters or the newly formed cluster.

10. The method of claim 8, wherein the condition for switching the first plurality of assets comprises a growth rate of a different cluster than the selected cluster exceeding a growth rate of the selected cluster by a threshold difference in growth rates, the different cluster being a cluster of the one or more clusters or the newly formed cluster, wherein the dynamically switching comprises switching the first plurality of assets responsive to determining that the growth rate of the different cluster exceeds the growth rate of the selected cluster by at least the threshold difference in growth rates, and wherein the different grouping of assets comprises the different cluster.

11. The method of claim 1, further comprising determining a confidence level for the first plurality of assets, the confidence level indicating a level of confidence about the grouping of the first plurality of assets, and automatically grouping the first plurality of assets responsive to the confidence level exceeding a predefined threshold confidence level.

12. The method of claim 1, further comprising presenting to a user the first plurality of assets for approval, and receiving input from the user indicating that the first plurality of assets is approved.

13. The method of claim 1, further comprising:
receiving a predefined asset reconciliation list comprising a list of assets to be included in the asset reconciliation; and
predefining, based on the received predefined asset reconciliation list, a working scan context prior to receiving the tag data of the plurality of radio frequency identification tags, the predefined working scan context based on assets reflected in the predefined asset reconciliation list, the assets in the predefined asset reconciliation list being assets in a database against which the asset reconciliation is to be performed, wherein the predefined working scan context defines a scope of coverage of assets reflected in the database, and wherein the first plurality of assets is grouped based, at least in part, on the predefined working scan context.

14. A system for asset reconciliation, the system comprising:
a processor configured to perform:
receiving tag data from a plurality of radio frequency identification tags carrying the tag data, the tag data representative of a plurality of assets;
identifying characteristics about each of the plurality of assets based on at least a portion of each respective tag data;
grouping a first plurality of assets based on a common characteristic of the characteristics of the first plurality of assets identified in each respective tag data;
receiving additional tag data from one or more additional radio frequency identification tags carrying the additional tag data, the additional tag data representative of one or more additional assets and including at least one characteristic of the one or more additional assets;
identifying which assets of the one or more additional assets are to be included in the first plurality of assets when the common characteristic is included within the additional tag data of the one or more additional assets; and
dynamically switching the first plurality of assets to a different grouping of assets, based on the received tag data from the one or more additional radio frequency identification tags, the dynamically switching being responsive to satisfying a condition for switching the first plurality of assets.

15. The system of claim 14, wherein tag data of each radio frequency identification tag of the plurality of radio frequency identification tags comprises indications of asset properties of the asset represented by the tag data of the respective radio frequency identification tag, and wherein identifying characteristics about each of the plurality of assets comprises identifying, based on the indications of asset properties in the tag data of the plurality of radio frequency identification tags, commonality between multiple assets of the plurality of assets, wherein the identifying commonality comprises:
performing data mining on the tag data from the plurality of radio frequency identification tags to identify the indications of asset properties thereof;
clustering tag data from radio frequency identification tags of the plurality of radio frequency identification tags according to at least one matching indication of asset properties, to form at least one cluster of tag data from radio frequency identification tags of the plurality of radio frequency identification tags; and
selecting a cluster from the at least one cluster, wherein the first plurality of assets comprises the selected cluster.

16. The system of claim 15, wherein the matching indication of asset properties comprises at least one of: a matching global trade item number encoded in the tag data, a matching Universal Product Code derived from the global trade item number encoded in the tag data, a matching European Article Number derived from the global trade item number encoded in the tag data, a matching asset manufacturer derived from the global trade item number encoded in the tag data, or a matching product type derived from the global trade item number encoded in the tag data.

17. The system of claim 15, wherein the system is further configured to perform, subsequent to the identifying which assets of the one or more additional assets are to be included in the first plurality of assets:
receiving tag data from further radio frequency identification tags;
performing data mining on the tag data from the further radio frequency identification tags and clustering tag data from radio frequency identification tags of the further radio frequency identification tags according to at least one matching identified indication of asset properties, wherein the received tag data from the further radio frequency identification tags are added to at least one of: a cluster of the one or more clusters or a newly formed cluster; and
dynamically changing the first plurality of assets to a different grouping of assets, based on the received tag data from the further radio frequency identification tags, the dynamically changing being responsive to satisfying a condition for changing the first plurality of assets.

18. A method for asset reconciliation, the method comprising:
receiving tag data which identifies characteristics about each of a plurality of assets;
determining, by at least one processor, a first plurality of assets based on a common characteristic of the identified characteristics of the first plurality of assets identified in each respective tag data;

after the determining, receiving additional tag data from one or more radio frequency identification tags carrying the tag data, the additional tag data representative of one or more additional assets; and identifying which assets of the one or more assets are to be included in the first plurality of assets when the common characteristic is included within the additional tag data of the one or more additional assets;

dynamically switching the first plurality of assets to a second grouping of assets having a common characteristic, based on the received tag data from the one or more additional radio frequency identification tags, the dynamically switching being responsive to satisfying a condition for switching the first plurality of assets; and displaying, on a display screen, the second grouping of assets rather than the first plurality of assets responsive to satisfying a condition for switching the first plurality of assets.

19. The method of claim 18, wherein determining the first plurality of assets comprises defining at least one cluster for performing clustering on the received tag data based on a matching indication of asset properties indicated in tag data, wherein the matching indication of asset properties comprises at least one of: a global trade item number encoded in the tag data, a Universal Product Code derived from the global trade item number encoded in the tag data, a European Article Number derived from the global trade item number encoded in the tag data, an asset manufacturer derived from the global trade item number encoded in the tag data, or a product type derived from the global trade item number encoded in the tag data.

20. The method of claim 18, wherein determining the first plurality of assets comprises defining at least one cluster for performing clustering of the received tag data based on a matching indication of asset properties indicated in received tag data, wherein the matching indication of asset properties comprises at least one of: a manager number encoded in the tag data, an object class encoded in the tag data, a Universal Product Code derived from the manager number and object class encoded in the tag data, a European Article Number derived from the manager number and object class encoded in the tag data, an asset manufacturer derived from the manager number encoded in the tag data, or a product type derived from the object class encoded in the tag data.

* * * * *